United States Patent
Shimada

[11] Patent Number: 5,889,537
[45] Date of Patent: Mar. 30, 1999

[54] DOT RECORDING METHOD AND APPARATUS THEREFOR

[75] Inventor: Kazumichi Shimada, Suwa, Japan

[73] Assignee: Seiko Epson Corporation, Tokyo, Japan

[21] Appl. No.: 919,288

[22] Filed: Aug. 28, 1997

[30] Foreign Application Priority Data

Aug. 28, 1996 [JP] Japan .................................. 8-247293

[51] Int. Cl.⁶ .............................. B41J 2/145; B41J 2/15; B41J 29/38
[52] U.S. Cl. .................................. 347/41; 347/9
[58] Field of Search ................... 347/41, 20, 9, 347/12, 32

[56] References Cited

U.S. PATENT DOCUMENTS

| 5,359,355 | 10/1994 | Nagoshi et al. | 347/9 |
| 5,686,944 | 11/1997 | Takagi et al. | 347/41 |

FOREIGN PATENT DOCUMENTS

| 0 518 670 | 12/1992 | European Pat. Off. . |
| 0 679 518 | 11/1995 | European Pat. Off. . |
| 3-207665 | 9/1991 | Japan . |
| 4-19030 | 3/1992 | Japan . |
| 8-216456 | 8/1996 | Japan . |

Primary Examiner—N. Le
Assistant Examiner—Thinh Nguyen
Attorney, Agent, or Firm—Oblon, Spivak, McClelland, Maier & Neustadt, P.C.

[57] ABSTRACT

A dot forming element array is driven during each main scan to enable successive formation in the main scanning direction of sets of N dots formed substantially along a straight line in a sub-scanning direction at intermittent timing which enables the dot forming element array conducting a scan in the main scanning direction to form a prescribed number of sets of N dots and thereafter disables it from forming dots for (s−1) dot positions (s being an integer greater than 1). An adjustment for shifting the recording positions of the sets of N of dots in the main scanning direction by an integral multiple of the dot pitch w from a prescribed basic position is effected in at least some main scans to enable servicing of multiple dot positions in a desired recording region on the recording medium.

17 Claims, 23 Drawing Sheets

Fig. 2(A) ARRANGEMENT OF NOZZLE ARRAYS
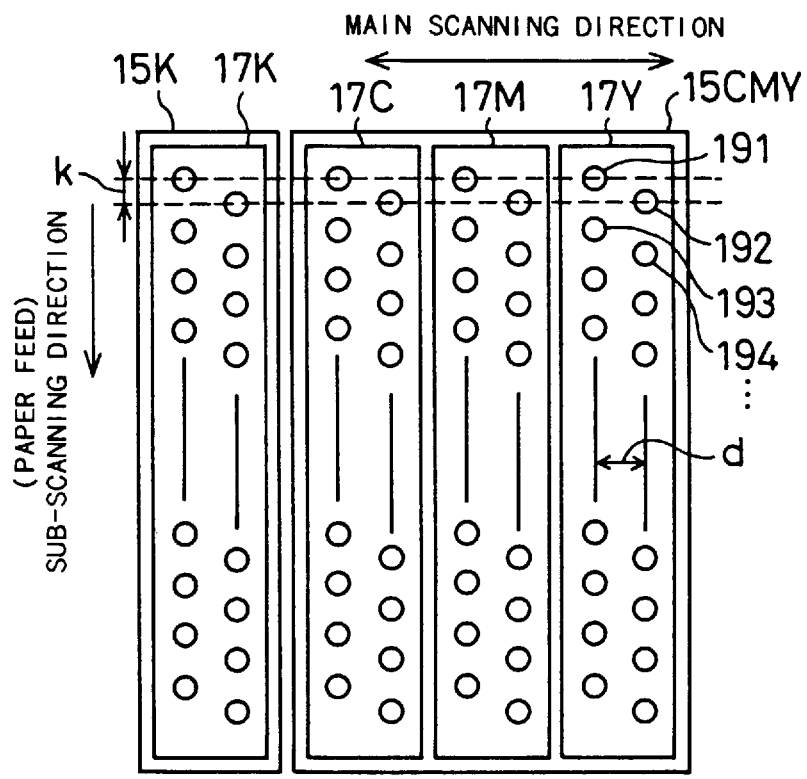
Fig. 2(B) SET OF DOTS FORMED BY 1 NOZZLE ARRAY

Fig. 5(A) FIRST MAIN SCAN  Fig. 5(B) SECOND MAIN SCAN
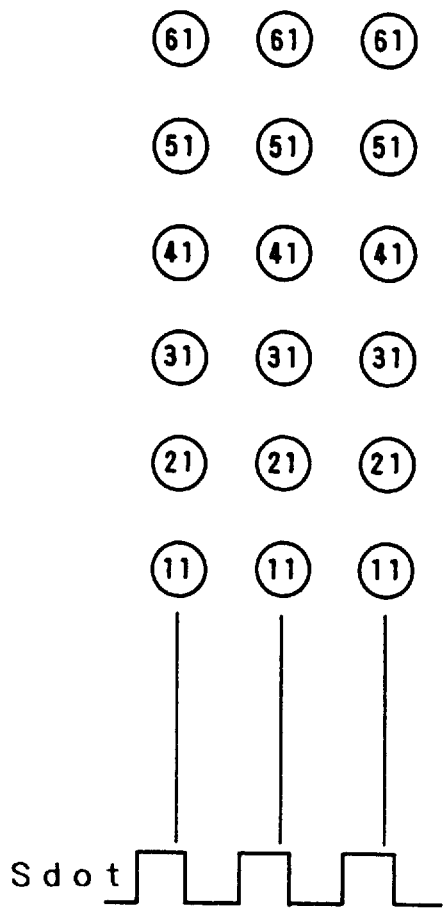
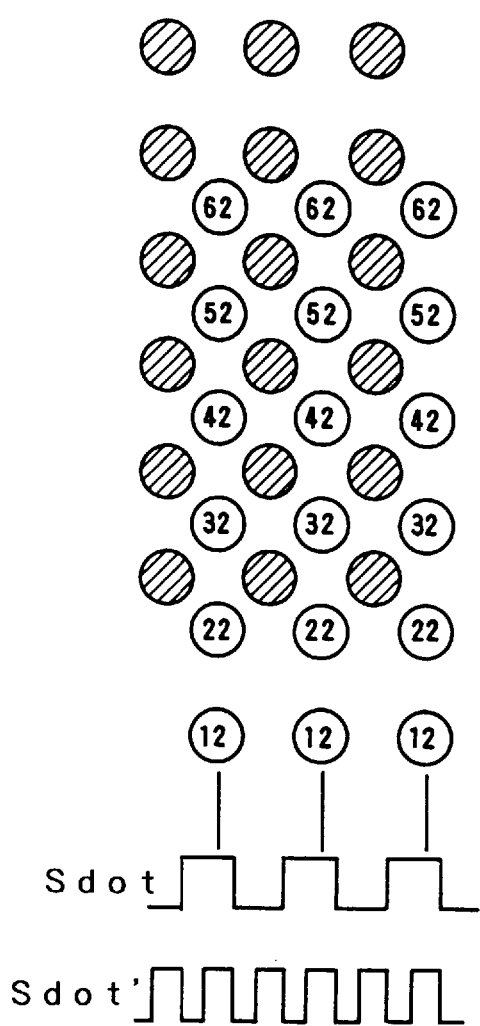

THIRD EMBODIMENT (k:ODD, s:ODD)

NUMBER OF NOZZLES: N = 8
NOZZLE PITCH: k = 3 [DOTS]
NUMBER OF SCAN REPEATS: s = 2

NOZZLE DENSITY: D [DOTS/INCH]
SUB-SCANNING PITCH: L [INCH]
DOT PITCH: w [INCH]
: w = 1/(D·k)

RECORDING START POSITION IN MAIN SCANNING DIRECTION IN THIRD EMBODIMENT

RECORDING START POSITION IN MAIN SCANNING DIRECTION IN FOURTH EMBODIMENT

RECORDING START POSITION IN MAIN SCANNING DIRECTION IN FIFTH EMBODIMENT (POSITION SHIFTED EVERY 3(=k) MAIN SCANS)

SEVENTH EMBODIMENT

NUMBER OF NOZZLES: N = 4
NOZZLE PITCH: k = 1 [DOT]
NUMBER OF SCAN REPEATS: s = 2

NOZZLE DENSITY: D [DOTS/INCH]
SUB-SCANNING PITCH: L [INCH]
DOT PITCH: w [INCH]
: w=1/(D·k)

SHINGLING SCHEME

NUMBER OF NOZZLES: N = 8
NOZZLE PITCH: k = 8 [DOTS]
NUMBER OF SCAN REPEATS: s = 2
NOZZLE DENSITY: D [DOTS/INCH]
SUB-SCANNING PITCH: L [INCH]
DOT PITCH: w [INCH]

DOT RECORDING METHOD AND APPARATUS THEREFOR

BACKGROUND OF THE INVENTION

1. Field of the Invention

This invention relates to a method and an apparatus which effect recording on the surface of a recording medium by a recording head which scans the surface of the recording medium in a main scanning direction and a sub-scanning direction.

2. Description of the Related Art

Recording apparatuses which effect recording while causing a recording head to scan in a main scanning direction and a sub-scanning include, for example, the serial scan printer and the drum scan printer. As taught by U.S. Pat. No. 4,198,642 and Japanese Patent Laying-Open Gazette No. 53-2040, for example, a technique called the "interlace scheme" has been developed for improving the image (print) quality of printers of this type, particularly those that employ ink jet nozzles.

FIG. 22 is a diagram for explaining an example of the interlace scheme. In this specification, the following parameters are used to define printing scheme.

N: Number of nozzles
k: Nozzle pitch
s: Number of scan repeats
D: Nozzle density [nozzle/inch]
L: Sub-scanning pitch [inch]
w: Dot pitch [inch]

The number of nozzles N is the number of nozzles used to form dots. In the example of FIG. 22, N=3. The nozzle pitch k is the interval between the centers of the recording head nozzles expressed in units of the recorded image pitch (dot pitch w). In the example of FIG. 22, k=2. The number of scan repeats s is the number of main scans in which all dot positions on a main scanning line are serviced. In the example of FIG. 22, s=1, i.e., all dot positions on a main scanning line are serviced in a single main scan. When s is 2 or greater, the dots are formed intermittently in the main scanning direction. This will be explained in detail later. The nozzle density D (nozzle/inch) is the number of nozzles per inch in the nozzle array of the recording head. The sub-scanning pitch L (inch) is the distance moved in 1 sub-scan. The dot pitch w (inch) is the pitch of the dots in the recorded image. In general, it holds that $w=1/(D \cdot k)$, $k=1/(D \cdot w)$.

The circles containing two-digit numerals in FIG. 22 indicate dot recording positions. As indicated in the legend, the numeral on the left in each circle indicates the nozzle number and the numeral on the right indicates the recording order (the number of the main scan in which it was recorded).

The interlace scheme shown in FIG. 22 is characterized by the configuration of the nozzle array of the recording head and the sub-scanning method. Specifically, in the interlace scheme, the nozzle pitch k indicating the interval between the centers of adjacent nozzles is defined as an integer not smaller than 2, while the number of nozzles N and the nozzle pitch k are selected as integers which are relatively prime. Further, sub-scanning pitch L is set to $N/(D \cdot k)$ $(=N \cdot w)$.

The interlace scheme has the advantage of enabling nonuniformity of nozzle pitch, ink jetting characteristic and the like to be spread out over the recorded image. Because of this, it improves image quality by mitigating the effect of any nonuniformity that may be present in the nozzle pitch, the jetting characteristic and the like.

The shingling scheme, also known as the multiscan scheme, taught for example by Japanese Patent Laying-Open Gazette No. 3-207665 and Japanese Patent Publication Gazette No. 4-19030 is another technique used to improve image quality in color ink jet printers.

FIG. 23 is a diagram for explaining an example of the shingling scheme. In the shingling scheme, 8 nozzles are divided into 2 nozzle sets. The first nozzle set is made up of 4 nozzles having even nozzle numbers (left numeral in each circle) and the second nozzle set is made up of 4 nozzles having odd nozzle numbers. In each main scan, the nozzle sets are each intermittently driven to form dots in the main scanning direction once every (s) dots. Since s=2 in the example of FIG. 23, a dot is formed at every second dot position. The timing of the driving of the nozzle sets is controlled so that the each nozzle set forms dots at different positions from the other in the main scanning direction. In other words, as shown in FIG. 23, the recording positions of the nozzles of the first nozzle set (nozzles number 8, 6, 4, 2) and those of the nozzles of the second nozzle set (nozzles number 7, 5, 3, 1) are offset from each other by 1 dot in the main scanning direction. This kind of scanning is conducted multiple times with the nozzle driving times being offset between the nozzle sets during each main scan to form all dots on the main scanning lines.

In the shingling scheme, the dots of each main scanning line are not all recorded by the same nozzle but by multiple nozzles. Even when the nozzle characteristics (pitch, jetting characteristic etc.) are not completely uniform, therefore, enhanced image quality can be obtained because the characteristics of the individual nozzles is prevented from affecting the entire main scanning line.

Securing high image quality with a printer or other recording apparatus requires prevention of image quality degradation by variance (nonuniformity) of the nozzle pitch, the jetting characteristic and the like. Conventionally this has been achieved by use of the aforesaid interlace scheme or shingling scheme.

A simple combination of the interlace scheme and the shingling scheme is problematic because it makes the scanning speed difficult to increase. This is because use of the shingling scheme requires the recording head to be supplied with a drive signal Sdot' (FIG. 23) capable, for example, of distinguishing both the dot positions of the even-numbered nozzles and the dot positions of the odd-numbered nozzles. This means that the recording head has to be supplied with a drive signal Sdot' capable of distinguishing all dot positions in the main scanning direction.

When the main scanning speed of the recording head (the carriage speed) is increased, the drive frequency of the drive signal Sdot' has to be increased in proportion. Moreover, the print data sent to the printer from a personal computer or other print data generating device have to be sent to the printer as data corresponding to the individual dot positions. Up to now, therefore, the recording head main scanning speed has sometimes been limited by the nozzle drive frequency and/or the print data supply speed.

SUMMARY OF THE INVENTION

Accordingly, an object of the present invention is to provide a recording method and a recording apparatus which achieve both better image quality and faster scanning speed.

In order to attain at least part of the above and other objects of the present invention, there is provided a recording apparatus for effecting recording on a surface of a recording medium by causing a recording head to scan the surface of the recording medium in a main scanning direction and a sub-scanning direction. The recording apparatus comprises: a dot forming element array disposed at a portion of the recording head facing the recording medium, the dot forming element array having N dot forming elements for forming sets of N dots of a same color at a substantially fixed pitch in the sub-scanning direction, where N is an integer greater than 1. The recording apparatus further comprises a main scan driving unit for causing the recording head to conduct main scans in the main scanning direction; a head driving unit for driving the dot forming element array during the main scans to form dots; and a sub-scan driving unit for conducting a sub-scan of a fixed distance in the sub-scanning direction at the end of each main scan. The head driving unit comprises: an intermittent driving unit for, during each main scan, driving the dot forming element array to enable formation of a set of N dots substantially along a straight line in the sub-scanning direction and to enable formation of plural sets of the N dots in the main scanning direction at intermittent timing such that the formation of the N dots is enabled for a prescribed number of dot positions in the main scanning direction and that the formation of the N dots is disabled for (s−1) dot positions in the main scanning direction where s is an integer greater than 1; and a recording position adjustment unit for effecting an adjustment for shifting the recording positions of the sets of N dots in the main scanning direction by an integral multiple of the dot pitch from a prescribed reference position in at least some main scans to enable servicing of multiple dot positions in a prescribed recording region on the recording medium.

The phrase "the formation of the N dots is enabled" means that a set of N dots is recorded on the recording medium upon application of a drive signal indicating that all of the N dots are to be formed. When a drive signal indicating that dots should not be formed at the recording position is applied, dots are of course not formed at that recording position. The phrase "enable servicing of multiple dot positions" is similar in meaning.

The intermittent driving unit drives, during each main scan, the dot forming element array to enable formation of a set of N dots substantially along a straight line in the sub-scanning direction and to enable formation of plural sets of the N dots in the main scanning direction at intermittent timing such that the formation of the N dots is enabled for one dot position in the main scanning direction and that the formation of the N dots is disabled for (s−1) dot positions in the main scanning direction. The integer s is a number of scan repeats indicating a number of main scans required for printing a continuous line in the main scanning direction. A sub-scanning pitch L is selected to satisfy the relationship of $L=N/(s \cdot D \cdot k)$ where L is the fixed distance, k is an element pitch indicating an interval between centers of adjacent ones of the N dots expressed in units of a dot pitch of a recorded image, and D is an element density indicating a number of dots per unit distance measured in the sub-scanning direction for the N dots is defined. The number of scan repeats s is set at a desired integer greater than 1 and less than N. The element pitch k is set at a desired integer which is greater than 1 and less than N and which is prime with respect to N/s.

In the above aspect of the invention, since during each main scan the dot forming element array forms a prescribed number of sets of N dots and is thereafter disabled from forming dots for (s−1) dot positions, the sets of dots are formed intermittently. Since this reduces the blotting that occurs when dots are formed adjacently, it enhances image (print) quality. Moreover, since sets of N dots aligned substantially along a straight line in the sub-scanning direction are successively formed, it suffices to drive the dot forming element array at a drive frequency matched to the main scan positions where dots are to be formed. Since, unlike in the prior art shingling scheme, this aspect of the invention does not require the dot forming element array to be driven at a drive frequency capable of distinguishing all dot positions in the main scanning direction, it enables the scanning speed to be increased. Further, when the dot forming element array forms 1 set of N dots and is thereafter disabled from forming dots for (s−1) dot positions, dots are never formed adjacently in the main scanning direction during 1 main scan. When the nozzle pitch k is 2 or greater, moreover, dots are never formed adjacently in the sub-scanning direction during 1 main scan. Since blotting owing to adjacent dot formation can therefore be reduced, the image quality can be further enhanced. In addition, when the sub-scanning pitch L is selected to satisfy the relationship $L=N/(s \cdot D \cdot k)$, the servicing of the dot positions in a desired recording region can conducted without missing any.

According to another aspect of the present invention, the recording apparatus further comprises a print data generating unit for generating print data for driving the dot forming element array, the head driving unit performing the driving of the dot forming element array responsive to the print data. The print data generating unit comprise a unit for intermittently supplying to the head driving unit during each main scan only data for the prescribed number of dot positions in the main scanning direction. This enables the processing speed to be increased since only the print data for the positions where dots are to be formed need be supplied.

The recording position adjustment unit may comprise a unit for periodically conducting the adjustment of the recording positions of the sets of N dots in the main scanning direction during each cycle, a cycle being defined as a prescribed number of main scans. This enables the dots to be periodically formed so as to reliably service all dot positions in a desired recording region.

The recording position adjustment unit may further comprise a unit for shifting the recording position in the main scanning direction with respect to each main scan during each cycle. This reduces the likelihood of blotting owing to adjacent dot formation since it reduces the probability of dots formed in 2 consecutive main scans being adjacent in the vertical direction.

Preferably, the head driving unit comprises not only the intermittent recording mode in which the dot forming element array is disabled from forming dots for (s−1) dot positions after forming of a set of the N dots at one dot position but also a nonintermittent recording mode in which the dot forming element array is enabled to form dots at all dot positions in the main scanning direction without skipping any dot positions; and the main scan driving unit scans the recording head in the intermittent recording mode s times faster than in the nonintermittent recording mode. This enables the recording head scanning speed to be increased in the intermittent recording mode.

The recording apparatus may further comprise a recording mode selecting unit for selecting one recording mode from among a plurality of recording modes having different numbers of scan repeats s. Increasing the number of scan repeats s increases the recording speed but degrades the image quality. When 1 recording mode can be selected from among a plurality of recording modes having different numbers of scan repeats s, the user is able select the recording mode as appropriate depending on whether precedence is to be given to image quality or speed.

The head driving unit may comprise a unit for driving the dot forming element array to enable servicing of s×k dot positions within a dot matrix having s dot positions in the main scanning direction and k dot positions in the sub-scanning direction by dot recording in s×k consecutive main scans. This enables each of the s×k dots in the dot matrix to be formed in a different main scan by a different nozzle. Since blotting owing to adjacent dot formation can therefore be reduced, the image quality can be further enhanced.

The head driving unit may comprises a unit for driving the dot forming element array during both a forward trip and a return trip of the main scan; and the sub-scan driving unit may comprise a unit for conducting a sub-scan of the fixed distance in the sub-scanning direction at the end of each forward trip and the end of each return trip. This enables the recording speed to be increased since recording can be effected on both the outward and return trip portions during main scanning of the dot forming element array.

According to another aspect of the present invention, there is provided a recording method for effecting recording on a recording medium using a recording head having a dot forming element array disposed at a portion of the recording head facing the recording medium, the dot forming element array having N dot forming elements for forming sets of N dots of a same color at a substantially fixed pitch in the sub-scanning direction, where N is an integer greater than 1. The method comprises the steps of: (a) causing the recording head to conduct main scans in the main scanning direction; (b) driving the dot forming element array during the main scans to form dots; and (c) conducting a sub-scan of a fixed distance in the sub-scanning direction at the end of each main scan. The step (b) comprises the steps of: (i) driving, during each main scan, the dot forming element array to enable formation of a set of N dots substantially along a straight line in the sub-scanning direction and to enable formation of plural sets of the N dots in the main scanning direction at intermittent timing such that the formation of the N dots is enabled for a prescribed number of dot positions in the main scanning direction and that the formation of the N dots is disabled for (s−1) dot positions in the main scanning direction where s is an integer greater than 1; and (ii) effecting an adjustment for shifting the recording positions of the sets of N dots in the main scanning direction by an integral multiple of the dot pitch from a prescribed reference position in at least some main scans to enable servicing of multiple dot positions in a prescribed recording region on the recording medium. The step (c) comprises the step of driving, during each main scan, the dot forming element array to enable formation of a set of N dots substantially along a straight line in the sub-scanning direction and to enable formation of plural sets of the N dots in the main scanning direction at intermittent timing such that the formation of the N dots is enabled for one dot position in the main scanning direction and that the formation of the N dots is disabled for (s−1) dot positions in the main scanning direction.

According to still another aspect, there is provided a computer program product, for use in a computer system comprising a printer having a recording head, for effecting recording on a recording medium using the recording head, the recording head having a dot forming element array disposed at a portion of the recording head facing the recording medium, the dot forming element array having N dot forming elements for forming sets of N dots of a same color at a substantially fixed pitch in the sub-scanning direction, where N is an integer greater than 1. The computer program product comprises: a computer readable medium; and computer program code stored on the computer readable medium. The computer program code comprises: first program code for causing a computer to drive, during each main scan, the dot forming element array to enable formation of a set of N dots substantially along a straight line in the sub-scanning direction and to enable formation of plural sets of the N dots in the main scanning direction at intermittent timing such that the formation of the N dots is enabled for a prescribed number of dot positions in the main scanning direction and that the formation of the N dots is disabled for (s−1) dot positions in the main scanning direction where s is an integer greater than 1; and second program code for causing the computer to effect an adjustment for shifting the recording positions of the sets of N dots in the main scanning direction by an integral multiple of the dot pitch from a prescribed reference position in at least some main scans to enable servicing of multiple dot positions in a prescribed recording region on the recording medium. The first program code means comprises program code means for causing the computer to drive, during each main scan, dot forming element array to enable formation of a set of N dots substantially along a straight line in the subscanning direction and to enable formation of plural sets of the N dots in the main scanning direction at intermittent timing such that the formation of the N dots is enabled for one dot position in the main scanning direction and that the formation of the N dots is disabled for (s−1) dot positions in the main scanning direction.

These and other objects, features, aspects, and advantages of the present invention will become more apparent from the following detailed description of the preferred embodiments with the accompanying drawings.

BRIEF DESCRIPTION OF THE DRAWINGS

FIGS. 2(A) and 2(B) are diagrams for explaining the ink jet nozzle arrays in the printing heads 15K, 15CMY;

FIGS. 5(A) and 5(B) are diagrams relating to the first embodiment separately showing the dots formed in the first main scan and the dots formed in the second main scan;

DESCRIPTION OF THE PREFERRED EMBODIMENT

A. Constitution of the Apparatus

Figure 1:
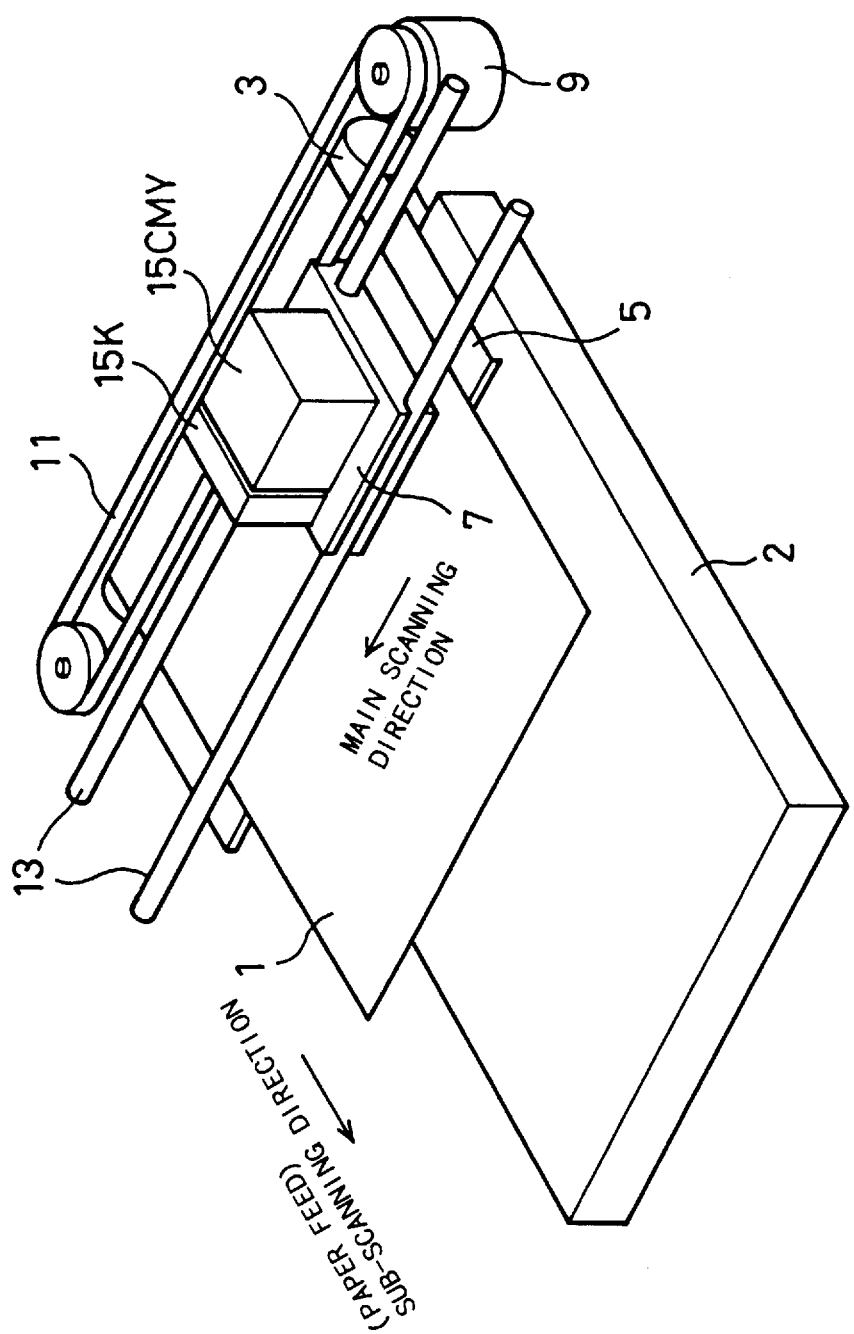
FIG. 1 is a schematic perspective view showing the mechanical structure of the main portion of a serial scan color ink jet printer embodying the present invention.

Embodiments of the invention will now be explained. FIG. 1 is a schematic perspective view showing the mechanical structure of the main portion of a serial scan color ink jet printer which is an embodiment of this invention. This printer is equipped with a printing paper stacker 2, a paper feed roller 3 driven by a stepper motor (not shown), a platen 5, carriage 7 holding printing heads 15K, 15CMY, a stepper motor 9, a draw belt 11 driven by the stepper motor 9, and a guide rail 13 for the carriage 7.

Printing paper 1 is fed from the printing paper 1, wound about the paper feed roller 3, and fed over the surface of the platen 5 in the sub-scanning direction. The carriage 7 is drawn by the draw belt 11 driven by the stepper motor 9 to move along the guide rail 13 in the main scanning direction. The main scanning direction is perpendicular to the sub-scanning direction.

The printing head 15K, which contains black (K) ink, and the printing head 15CMY, which contains cyan (C) ink, magenta (M) ink and yellow (Y) ink, are fastened on top of the carriage 7. The printing heads 15K, 15CMY are aligned in the main scanning direction. The color ink printing head 15CMY includes a separate printing head for each of the 3 colors.

FIGS. 2(A) and 2(B) are diagrams for explaining the ink jet nozzle arrays in the printing heads 15K, 15CMY. As shown in FIG. 2(A), the first printing head 15K is provided with a nozzle array 17K for jetting K ink. The second printing head 15CMY is provided with nozzle arrays 17C, 17M, 17Y for jetting C ink, M ink and Y ink. The positions of the 4 nozzle arrays 17K, 17C, 17M, 17Y coincide perfectly in the sub-scanning direction. The nozzle arrays 17K, 17C, 17M, 17Y are lined up in this order in the main scanning direction.

Each of the nozzle arrays 17K, 17C, 17M, 17Y has a large number of jet nozzles 191, 192, . . . staggered at a constant pitch k in the sub-scanning direction. The jet nozzles 191, 192, . . . included in each nozzle do not have to be staggered. They can instead be arranged in a straight line. The staggered arrangement is advantageous, however, from the point of achieving a small nozzle pitch k as shown in FIG. 2(A).

FIG. 2(B) shows the array of dots formed by a single nozzle array. In this embodiment, the nozzles are supplied with drive signals such that the dots formed by a single array all substantially fall on a straight line in the sub-scanning direction regardless of whether the ink nozzle arrangement is staggered or straight. Consider the case where a staggered nozzle array such as shown in FIG. 2(A) is driven to form dots during scanning, taking the nozzle array 17Y on the right side of FIG. 2(A) as an example. In this case, drive signals are applied the leading nozzle set 192, 194, d/v [sec] before they are applied to the trailing nozzle set 191, 193. As shown in FIG. 2(A), d [inch] is the pitch between the 2 nozzle sets in the nozzle array 17Y, and v [inch/sec] is the scanning speed of the printing head 15CMY.

In the scanning method adopted in this embodiment, the main scanning and the sub-scanning are repeated alternately. In unidirectional printing, the nozzle arrays of the printing heads 15K, 15CMY are driven to form dots on the printing paper 1 only during the outward trip portion of each reciprocation in the main scanning direction. At the completion of each reciprocation, the printing paper 1 is fed a fixed distance in the sub-scanning direction. In bidirectional printing, the nozzle arrays of the printing heads 15K, 15CMY are driven to form dots both during the outward trip portion and the return trip portion of each reciprocation in the main scanning direction. At the completion of each outward trip and the completion of each return trip, the printing paper 1 is fed a fixed distance in the sub-scanning direction.

In the following, various embodiments of the dot recording scheme according to this invention are explained first.

B. First Embodiment

Figure 3:
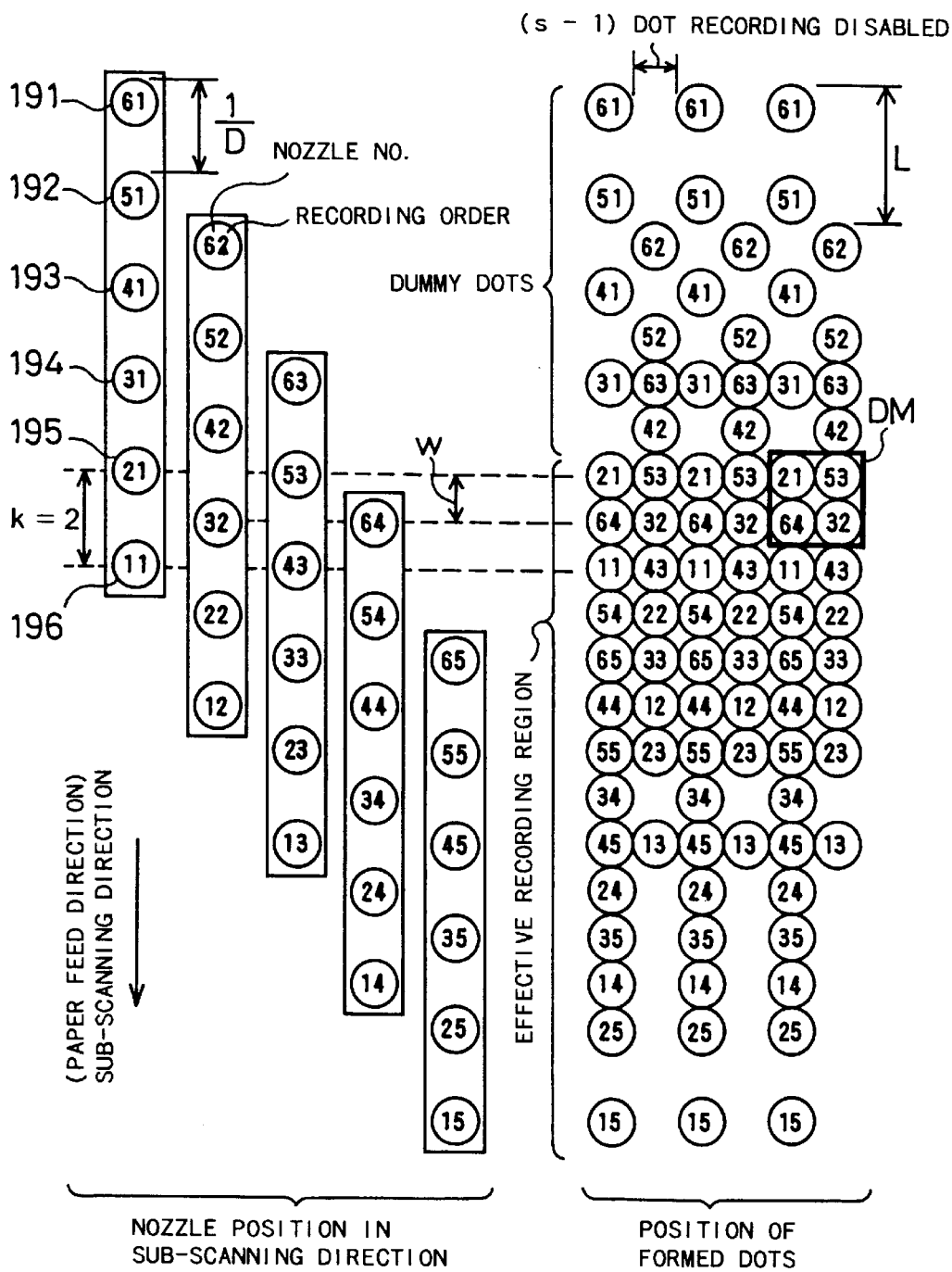
FIG. 3 is a diagram for explaining the dot recording scheme of a first embodiment.

FIG. 3 is a diagram for explaining the dot recording scheme of a first embodiment. The parameters indicated at the top of FIG. 3 have the same meanings as explained earlier regarding the prior art. Specifically, the number of nozzles N is the number of nozzles used to form dots. The nozzle pitch k is the interval between the centers of the nozzles in the nozzle array expressed in units of the recorded image pitch (dot pitch w). The number of scan repeats s is the number of main scans in which all dot positions on a main scanning line are serviced. The nozzle density D (nozzle/inch) is the number of nozzles per inch in the nozzle array. The sub-scanning pitch L (inch) is the distance moved in 1 sub-scan. The dot pitch w (inch) is the pitch of the dots in the recorded image.

In this invention, the number of scan repeats s is an arbitrary integer greater than 1 and less than N. The nozzle pitch k is an arbitrary integer greater than 0 and less than N which is prime relative to N/s. It is preferably an integer greater than 1 and less than N.

In this first embodiment, the nozzle pitch k and the number of scan repeats s are both even numbers. Specifically, k=s=2. The number of nozzles N is 6. Therefore, N/s=3, which is prime relative to the nozzle pitch k (=2).

In the interest of simplicity, the example of FIG. 3 uses only 6 nozzles 191–196 of the large number of nozzles included in a single nozzle array. In other words, the number of nozzles N equals 6. Thus the number of nozzles N is defined not as the total number of nozzles included in a single nozzle array but as the number of nozzles used to form dots. The number of nozzles N is of course the number of nozzles used to form dots of 1 color. When dots of 4 colors are formed, therefore, the overall number of nozzles used is 4N.

The left half of FIG. 3 models the sub-scanning positions of the nozzle array in 6 main scans. In the two-digit numeral in each circle, the numeral on the left in each circle indicates the nozzle number and the numeral on the right indicates the recording order (the number of the main scan in which it was recorded). The right half of FIG. 3 shows the positions at which dots can be formed in 6 scans. In the first main scan, for instance, dots are formed at the positions of the circles containing the numerals 61–11. Since the dot positions in the region marked "Dummy dots" on the right half of FIG. 3 are not all serviced, the dot formation in this region is disabled during actual printing. The region below the dummy dot region is the effective recording region (effective printing region) in which recording can be effected during actual printing.

As can be understood from FIG. 3, during the first main scan each of the 6 nozzles 191–196 is intermittently driven to form sets of dots separated by an interval of 1 dot position in the main scanning direction, i.e., to form a dot at every second dot position. It is clear from the definition of the number of scan repeats s that all dot positions on a main scanning line are serviced in s (=2) scans. It follows, therefore, that in each main scan the intervals in the main scanning direction where dot formation is disabled are equal to (s−1) dot positions each. In other words, after a nozzle conducting a scan in the main scanning direction forms a dot, it is disabled (prohibited from forming dots) for (s−1) dot positions, and then enabled to form the next dot. Since s=2 in the first embodiment, each nozzle disablement interval is equal to 1 dot position.

When the first main scan is completed, a sub-scan of a distance equal to the sub-scanning pitch L [inch] is conducted. In this invention, the sub-scanning pitch L is defined to satisfy Eq. (1).

$$L = N/(s \cdot D \cdot k) \qquad (1)$$

As pointed out earlier, $1/(D \cdot k)$ is equal to the dot pitch w [inch] of the recorded image. Eq. (1) therefore means that the sub-scanning pitch L is set to N/s times the dot pitch w. Since N/s=3 in the first embodiment, the sub-scanning pitch L equals 3w.

In the second main scan, the recording positions of the N dots are adjusted by shifting them in the main scanning direction by an integer multiple of the dot pitch w. In the example of FIG. 3, the positions at which the dots are recorded in the second main scan (positions of the circles containing numerals 61–12) are positions shifted by 1 dot pitch to the right.

Figure 4:
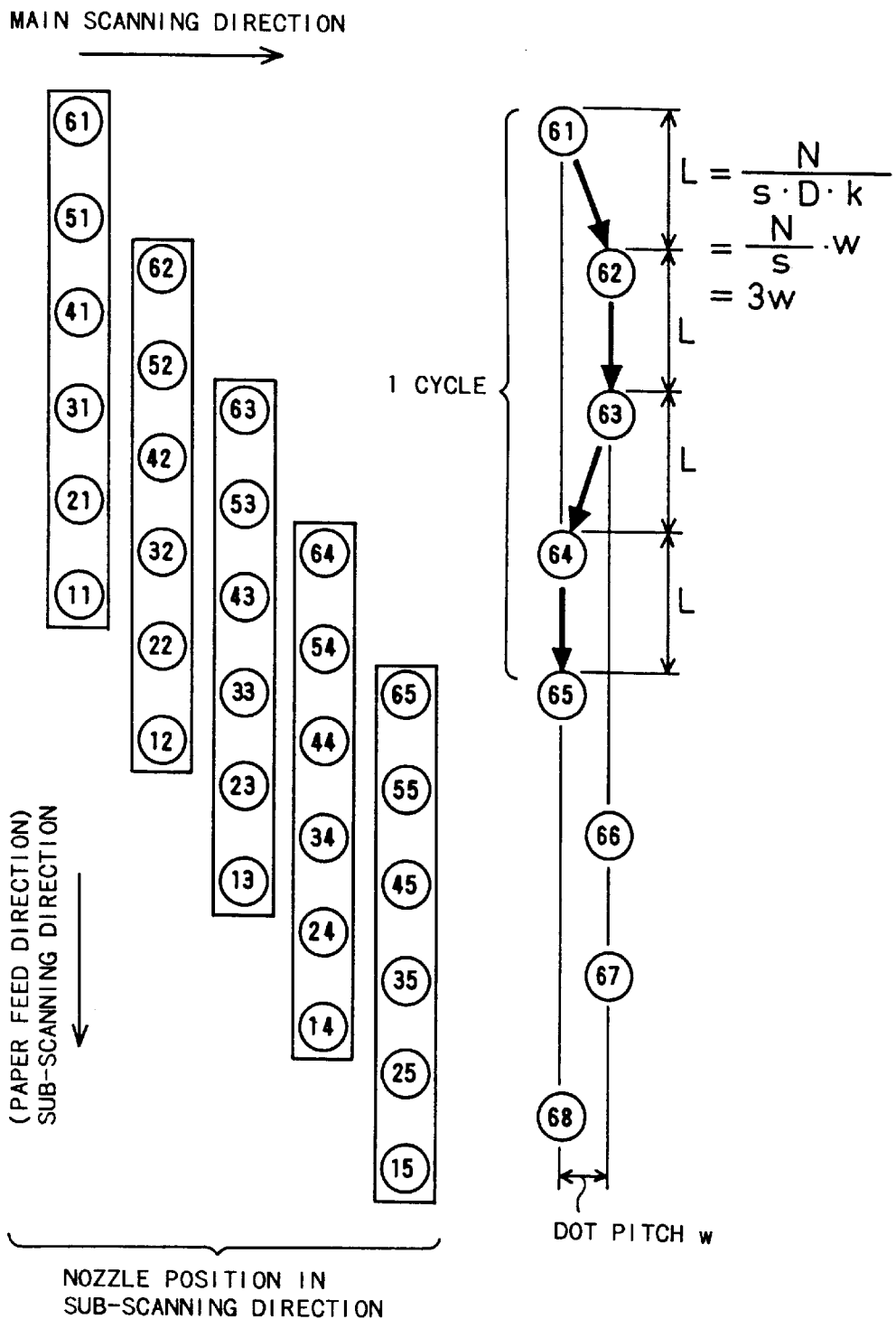
FIG. 4 is a diagram for explaining the dot recording start positions in each main scan in the first embodiment.

FIG. 4 is a diagram for explaining the dot recording start positions in each main scan in the first embodiment. The case of unidirectional printing in which the main scans are conducted from left to right in FIG. 4 will be considered. In this case, the dot recording start position in the second main scan (position of circle 62) is shifted 1 dot pitch in the main scanning direction from the recording start position in the first main scan (position of circle 61). The recording start position in the third main scan is the same as that in the second and the recording start positions in the fourth and fifth main scans are the same as that in the first.

Upon completion of the recording start position shift pattern indicated by the thick arrows in FIG. 4, the same shift pattern is repeated. Thus these 4 scans (the first to fourth scans) constitute 1 recording start position shift cycle. The same recording start position adjustment is periodically repeated thereafter. Since a sub-scan is invariably effected after every main scan, 4 sub-scans can also be viewed as constituting 1 cycle.

The recording position adjustment shown in FIG. 4 can also be used in bidirectional printing. In this case, since the main scanning direction reverses at each sub-scan (between the outward and return trips), the recording positions in the outward and return trips are adjusted to match those shown in FIG. 4.

As explained above, the first embodiment effects sub-scanning by the distance of the sub-scanning pitch L and, at every sub-scan, the recording positions of the N dots in the main scanning direction are adjusted to shift them by an integer multiple (including 0) of the dot pitch w. The sub-scan feeding and the adjustment of the main scanning recording positions are made so as to enable servicing of all dots in the effective recording region (FIG. 3).

At the far right in FIG. 3 is shown a dot matrix DM measuring s dots in the main scanning direction x k dots in the sub-scanning direction (2×2 in FIG. 3). The s×k dots in the dot matrix DM are formed by s×k (=4) main scans. This is clear from the fact that right-hand numerals (indicating recording order) in the dots in the dot matrix DM are all different (1, 2, 3 and 4). The whole of the effective recording region is tiled with such s×k dot matrices DM. It is also clear that each dot in a dot matrix DM is formed by a different nozzle. In other words, each of the s×k dots in the dot matrix DM is formed in a different main scan by a different nozzle.

The fact that "each of the s×k dots in the dot matrix DM is formed in a different main scan by a different nozzle" corresponds to the fact that the 4 scans of the 1 cycle shown in FIG. 4 includes s×k main scans. Since s=k=2 in the first embodiment shown in FIG. 4, each cycle includes 4 scans. Another feature of the invention is that the amount of recording position shift (adjustment) in the main scanning direction can be any of s types, namely, any type between 0 and (s−1)·w. Since s=2 in the first embodiment, the amount of recording position shift in the main scanning direction is of only 2 types, 0 and w. The same recording position as that in the first main scan is defined as the basic position and the shift amount thereof is 0. Another feature of the invention is that s types of shift amount adjustment are each conducted k times during 1 cycle. In the case of FIG. 4, 2 adjustments of 0 shift amount and 2 adjustments of w shift amount are conducted.

Figure 23:
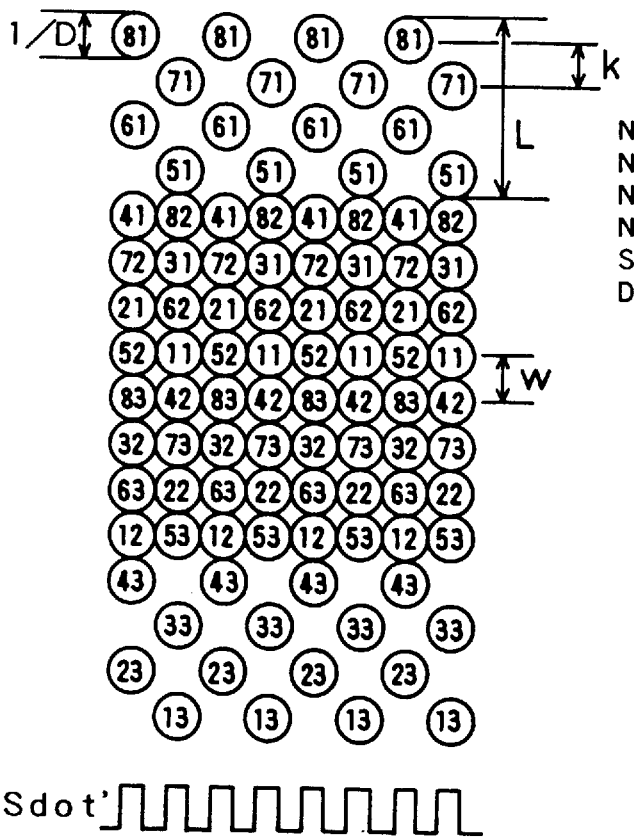
FIG. 23 is a diagram for explaining an example of the prior-art shingling scheme.

FIGS. 5(A) and 5(B) are diagrams relating to the first embodiment separately showing the dots formed in the first main scan and the dots formed in the second main scan. FIG. 5(A) shows the dots (61–11) formed in the first main scan and FIG. 5(B) shows the dots (62–12) formed in the second main scan. In FIG. 5(B), the hatched dots are the ones formed in the first main scan. In this invention, sets of N dots are formed substantially along a straight line in the sub-scanning direction during 1 main scan. In 1 main scan, therefore, it suffices to drive the nozzle array with a drive signal Sdot of a frequency corresponding to the dot forming positions. The drive signal Sdot' shown at the bottom of FIG. 5(B) is the drive signal used when the conventional shingling scheme is adopted. As explained earlier with reference to FIG. 23, the conventional shingling scheme would form both the dots recorded in the first main scan shown in FIG. 5(A) and the dots recorded in the second main scan shown in FIG. 5(B) in a single main scan. The nozzle array drive signal Sdot' in the conventional shingling scheme therefore has to have double the frequency of drive signal Sdot in the first embodiment.

Since the invention forms sets of N dots substantially aligned along a straight line in the sub-scanning direction during each main scan, the nozzle array can be driven at a lower drive frequency than in the prior-art shingling scheme. As explained further later, the printer driver of a computer system generates print data for on/off control of the nozzle arrays and sends the generated print data to the printer. The print data are sent to the printer at a transfer rate corresponding to the printer drive frequency. Since in this invention no data need be sent to the printer for positions where dots are not formed, during each main scan only data for the dot forming positions occurring once every s dot positions need be transferred. When s=2, for instance, it suffices to transfer only print data for the even-numbered columns during some scans and to transfer print data for the odd-numbered columns during others. The printer driver is therefore not required to generate print data for all dot positions on the main scan lines but only for the positions where dots are to be formed. The processing time required is therefore shortened.

In this invention, the nozzle array drive frequency can be lower and the data transfer rate be slower than in the prior art. In most printers, the printer speed is determined by the nozzle array drive frequency or the rate of data transfer to the printer. The invention enables the scanning speed of the carriage 7 to be made faster than in the past also in such cases. On the other hand, when the carriage speed is the same as in the prior art, the drive signal frequency and/or the print data transfer rate can be set lower than heretofore. The intermittent recording mode in which a dot is recorded once every s dot positions is not the only printer operating mode possible. A nonintermittent recording mode in which dots are formed in order at all dot positions on the main scanning line without skipping any dot positions is also available. In the sth dot intermittent recording mode the main scan can be conducted at a carriage speed that is s times that in the nonintermittent recording mode.

C. Second Embodiment

Figure 6:
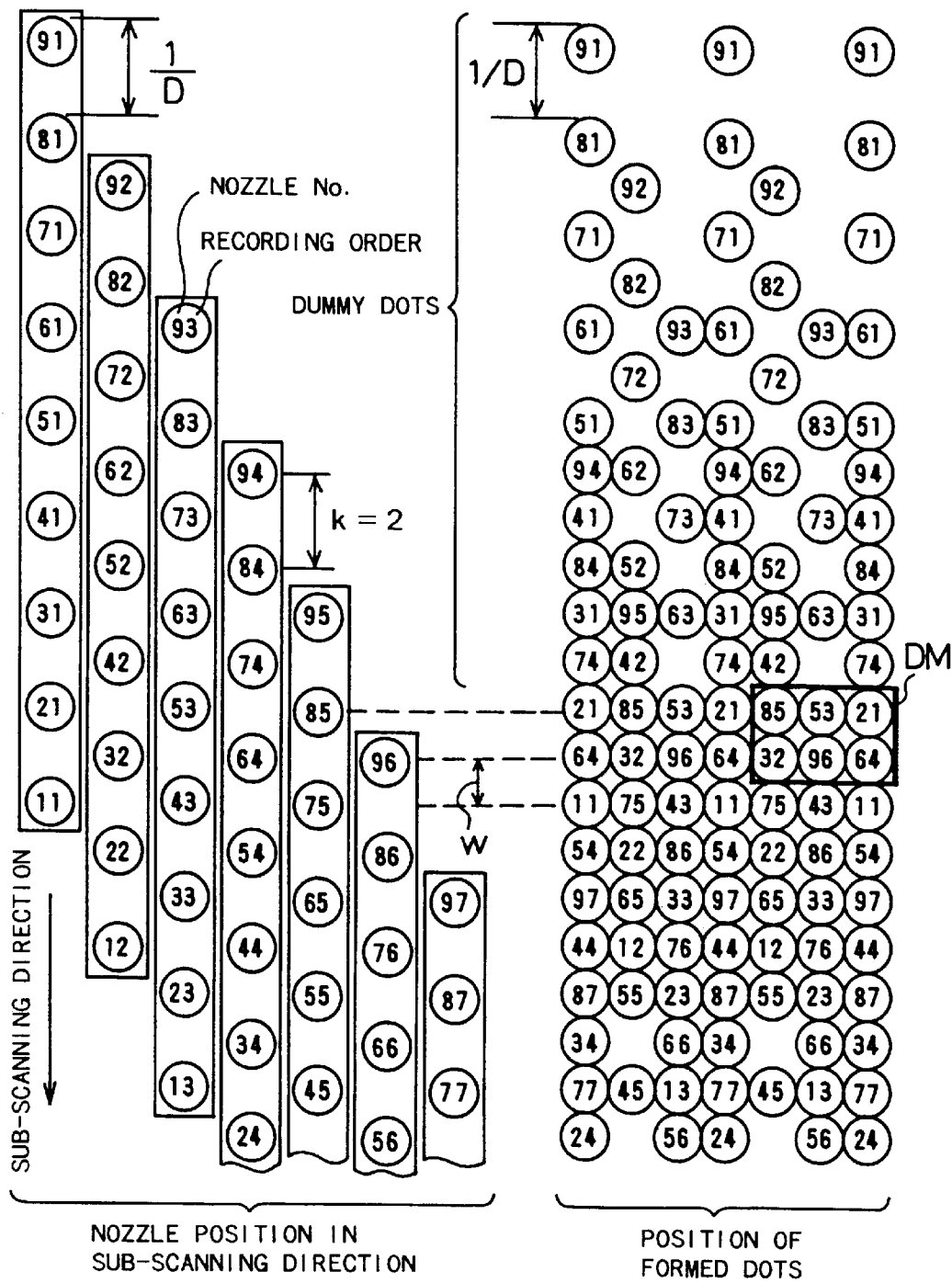
FIG. 6 is a diagram for explaining the dot recording scheme of a second embodiment.

FIG. 6 is a diagram for explaining the dot recording scheme of a second embodiment. In the second embodiment, the nozzle pitch k is even and the number of scan repeats s is odd. Specifically, k=2, s=3. The number of nozzles N is 9 and N/s=3, so that N/s and nozzle pitch k are relatively prime.

During each main scan, each of the 9 nozzles is intermittently driven to form sets of dots separated by an interval of 2 dot positions in the main scanning direction, i.e., to form a dot at every third dot position. In other words, after a nozzle conducting a scan in the main scanning direction forms a dot, it is disabled for (s−1)=2 dot positions, and then enabled to form the next dot.

Each of the s×k (=3×3) dots in the dot matrix DM at the far right in FIG. 6 is formed in a different main scan by a different nozzle.

Figure 7:
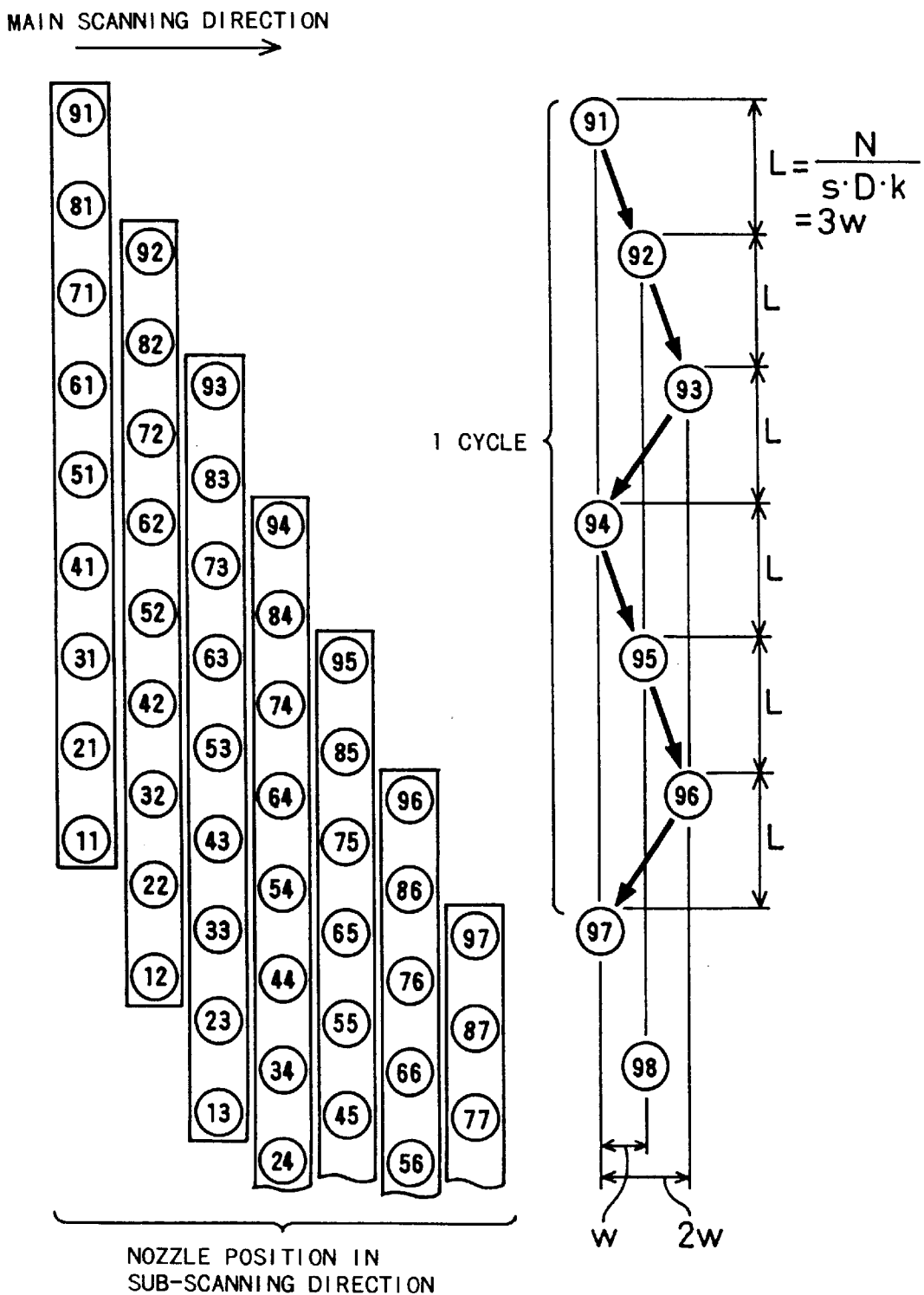
FIG. 7 is a diagram for explaining the dot recording start positions in each main scan in the second embodiment.

FIG. 7 is a diagram for explaining the dot recording start positions in each main scan in the second embodiment. In the second embodiment, the sub-scanning pitch L is equal to 3w (w being the dot pitch). The dot recording start position in the second main scan (position of circle 92) is shifted 1 dot pitch in the main scanning direction from the recording start position in the first main scan (position of circle 91). The recording start position in the third main scan is shifted 1 dot pitch in the main scanning direction from that in the second. The recording start position in the fourth main scan is the same as that in the first. The recording start positions in the fifth and sixth main scans are the same as those in the second and third main scans, respectively. The pattern of the s×k=6 recording start position shifts indicated by the thick arrows constitute 1 cycle. That is, in the second embodiment 6 main scans constitute 1 cycle and the adjustment of the recording start position in the main scanning direction is periodically repeated once every cycle.

As mentioned earlier, the amount of recording position shift in the main scanning direction can be any of s types in this invention, namely, any type between 0 and (s−1) w (w being the dot pitch). The s types of shift amount adjustment are each conducted k times during 1 cycle. Since s=3 and k=2 in the second embodiment, adjustments of 0 shift amount, w shift amount and 2w shift amount are each conducted twice during 1 cycle.

In the example of FIG. 7, the recording start position in the first to third scans are respectively the same as the recording start position in the fourth to sixth scans. The second embodiment can therefore be viewed as periodically repeating a minor cycle of 3 scans. However, this does not change the fact that s×k main scans constitute 1 cycle. The order of the s×k recording start positions in this 1 cycle can be altered as desired. For example, the recording start position in the second main scan (shifted by w from the basic position) and the recording start position in the third main scan (shifted by 2w from the basic position) can be interchanged. Although no minor cycle of 3 main scans is constituted in this case, the fact that s×k main scans constitute 1 cycle remains unchanged.

Also in this second embodiment, sets of N dots are formed substantially along a straight line in the sub-scanning direction during 1 main scan. The scanning speed of the carriage 7 can therefore be increased for the same reason as explained regarding the first embodiment with reference to FIG. 5.

Like the first embodiment, the second embodiment can also conduct bidirectional printing and be applied in color printing using inks of multiple colors.

D. Third Embodiment

Figure 8:
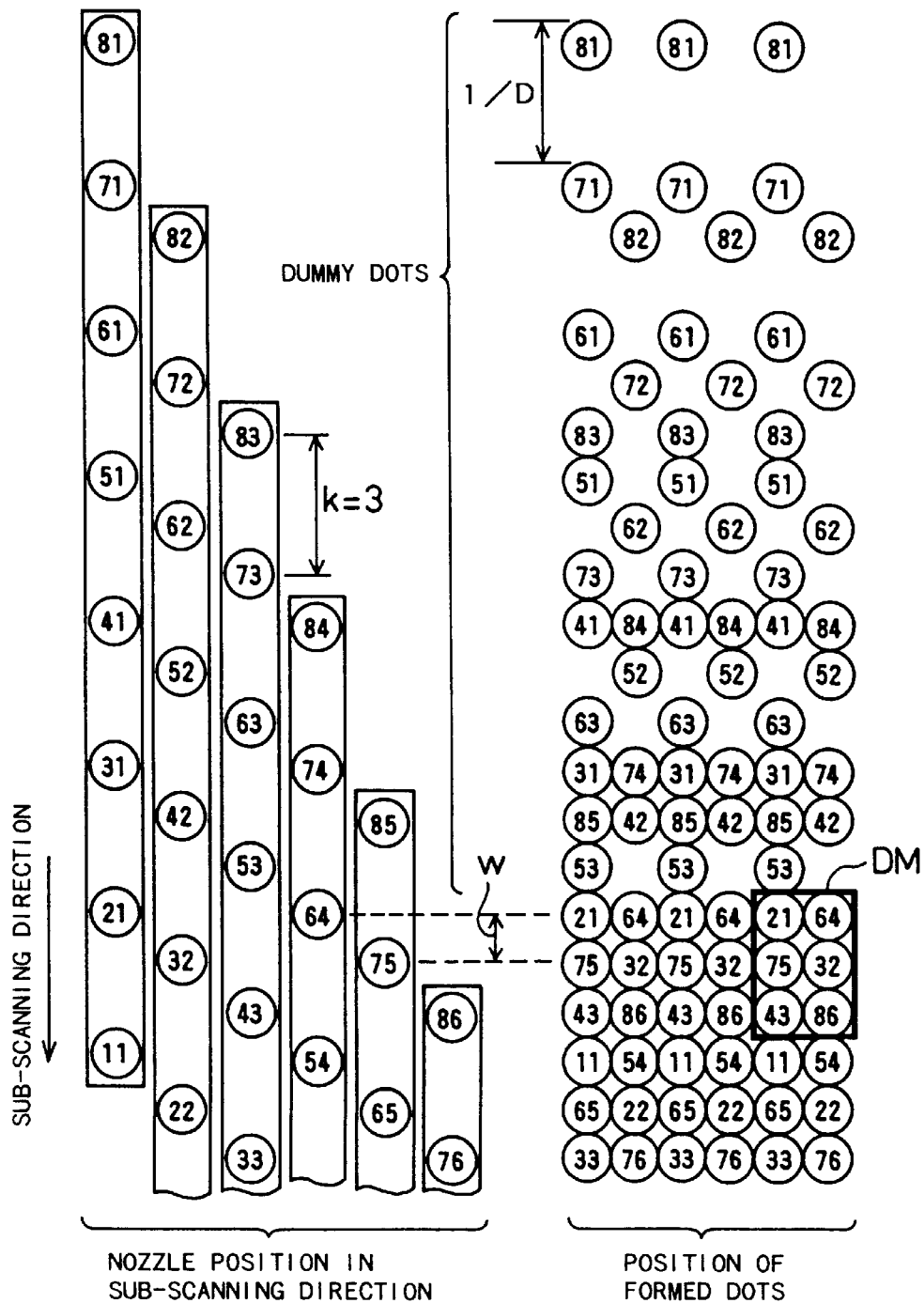
FIG. 8 is a diagram for explaining the dot recording scheme of a third embodiment.

FIG. 8 is a diagram for explaining the dot recording scheme of a third embodiment. In the third embodiment, the nozzle pitch k is odd and the number of scan repeats s is even. Specifically, k=3, s=2. The number of nozzles N is 8 and N/s=4, so that N/s and nozzle pitch k are relatively prime.

During each main scan, each of the 8 nozzles is intermittently driven to form sets of dots separated by an interval of 1 dot position in the main scanning direction, i.e., to form a dot at every second dot position. In other words, after a nozzle conducting a scan in the main scanning direction forms a dot, it is disabled for (s−1)=1 dot positions, and then enabled to form the next dot.

Each of the s×k (=2×3) dots in the dot matrix DM at the far right in FIG. 8 is formed in a different main scan by a different nozzle.

Figure 9:
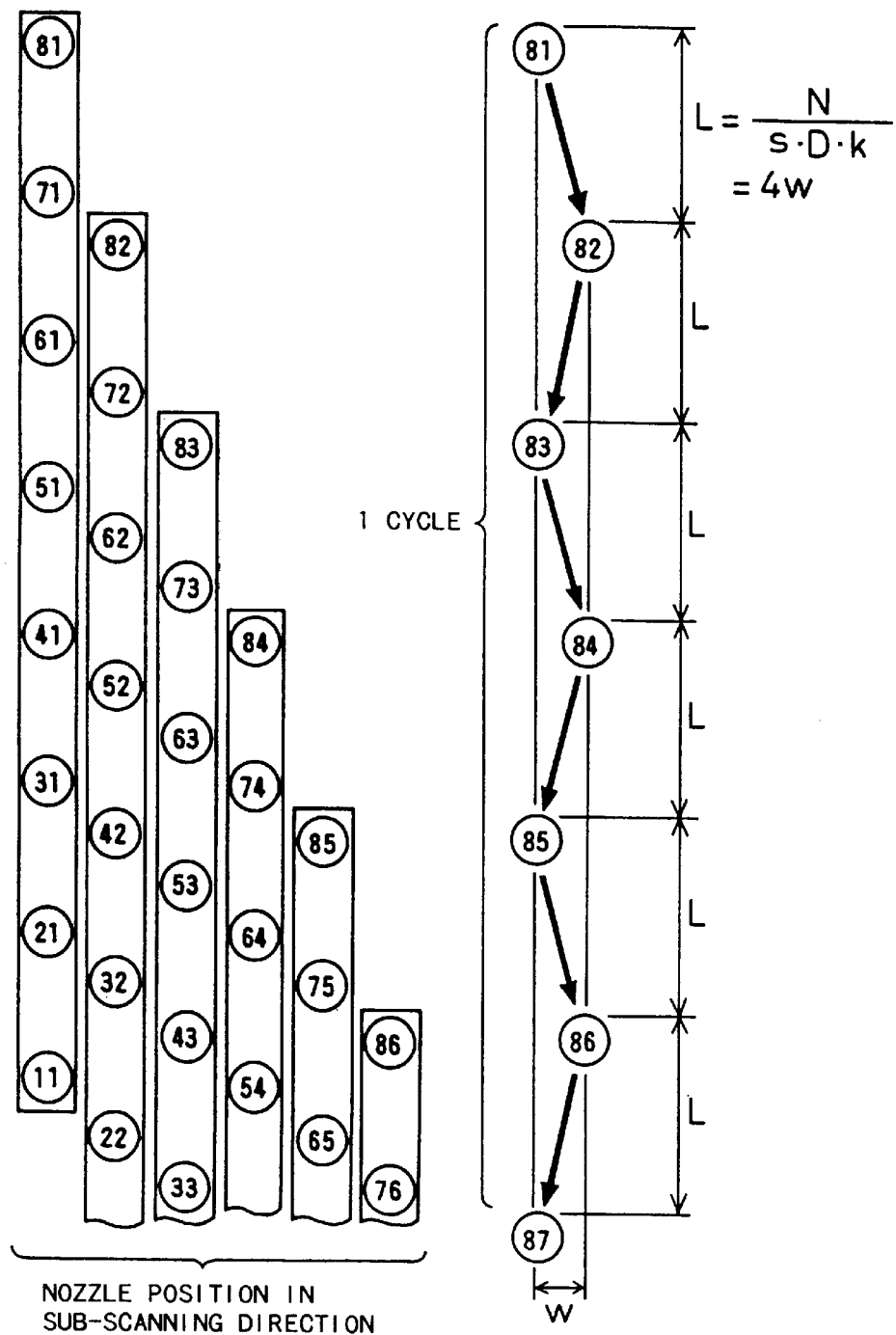
FIG. 9 is a diagram for explaining the dot recording start positions in each main scan in the third embodiment.

FIG. 9 is a diagram for explaining the dot recording start positions in each main scan in the third embodiment. In the third embodiment, the sub-scanning pitch L is equal to 4w (w being the dot pitch). In the third embodiment, the dot recording start position in the even-numbered main scans (position of circles 82, 84, 86) is shifted 1 dot pitch in the main scanning direction from the recording start position in the first main scan (position of circle 81). The recording start position in the odd-numbered main scans (position of circles 83, 85, 87) is the same as that in the first main scan. In other words, in the third embodiment, 2 scans constitute a minor cycle of the recording start position shift pattern. However, this does not change the fact that the pattern of the s×k=6 recording start position shifts indicated by the thick arrows constitute 1 cycle. That is, in the third embodiment 6 main scans constitute 1 cycle and the shifting of the recording start position in the main scanning direction is periodically repeated once every cycle.

As mentioned earlier, the amount of recording position shift in the main scanning direction at the time of sub-scanning can be any of s types in this invention, namely, any type between 0 and (s−1)·w (w being the dot pitch). The s types of shift amount adjustment are each conducted k times during 1 cycle. Since s=2 and k=3 in the third embodiment, the shift amount in the main scanning direction is of 2 types, 0 and w, and adjustment by each of these shift amounts is conducted 3 times during 1 cycle.

Also in this third embodiment, sets of N dots are formed substantially along a straight line in the sub-scanning direction during 1 main scan. The scanning speed of the carriage 7 can therefore be increased for the same reason as explained regarding the first embodiment with reference to FIG. 5.

Like the first embodiment, the third embodiment can also conduct bidirectional printing and be applied in color printing using inks of multiple colors.

E. Fourth Embodiment

Figure 10:
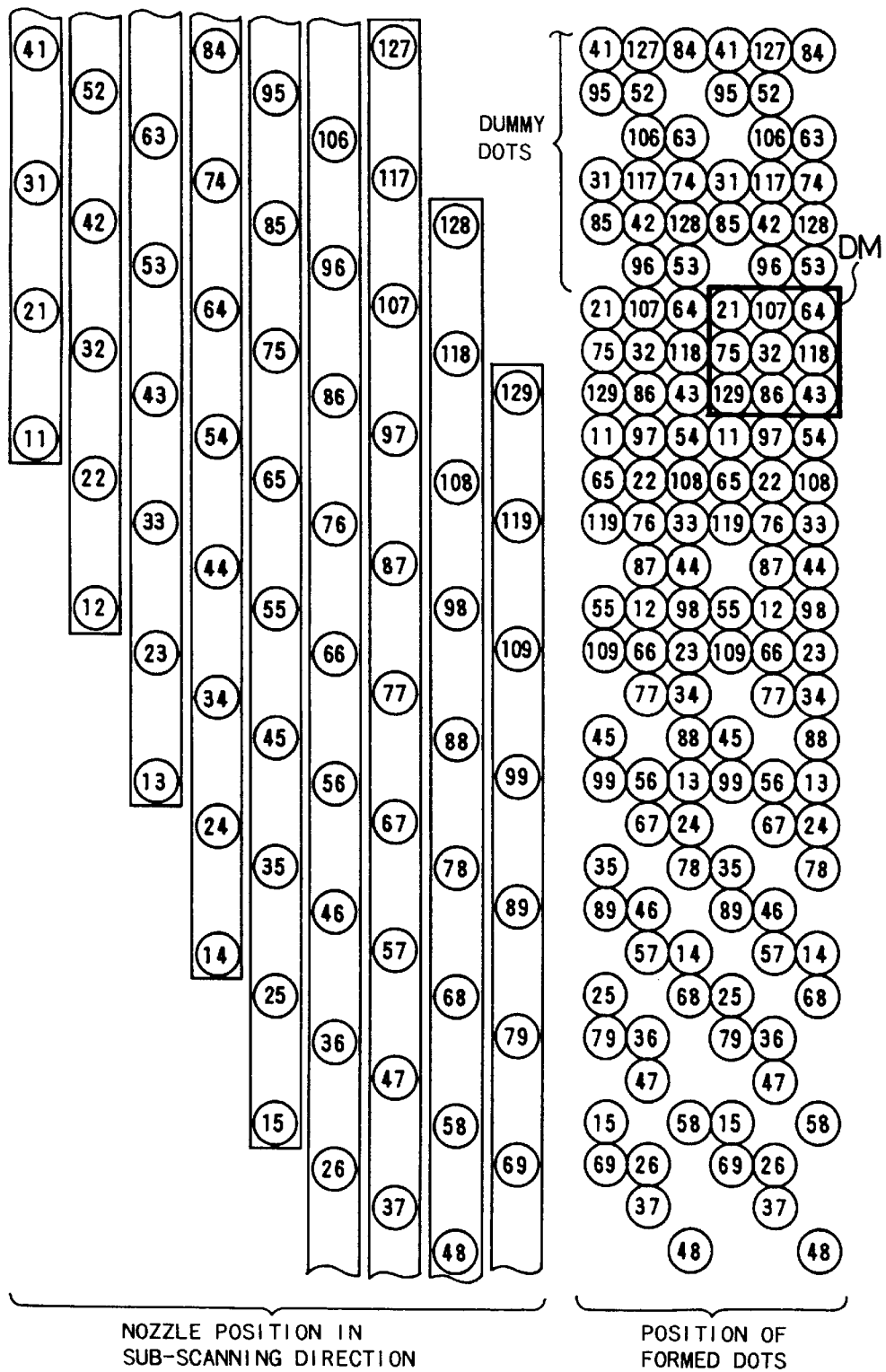
FIG. 10 is a diagram for explaining the dot recording scheme of a fourth embodiment.

FIG. 10 is a diagram for explaining the dot recording scheme of a fourth embodiment. In the fourth embodiment, the nozzle pitch k and the number of scan repeats s are both odd. Specifically, k=3, s=3. The number of nozzles N is 12 and N/s=4, so that N/s and nozzle pitch k are relatively prime.

During each main scan, each of the 12 nozzles is intermittently driven to form sets of dots separated by an interval of 2 dot positions in the main scanning direction, i.e., to form a dot at every third dot position. In other words, after a nozzle conducting a scan in the main scanning direction forms a dot, it is disabled for (s−1)=2 dot positions, and then enabled to form the next dot. (Some of the nozzles have been omitted from the left half of FIG. 10 for convenience of drawing preparation.)

Each of the s×k (=3×3) dots in the dot matrix DM at the far right in FIG. 10 is formed in a different main scan by a different nozzle.

Figure 11:
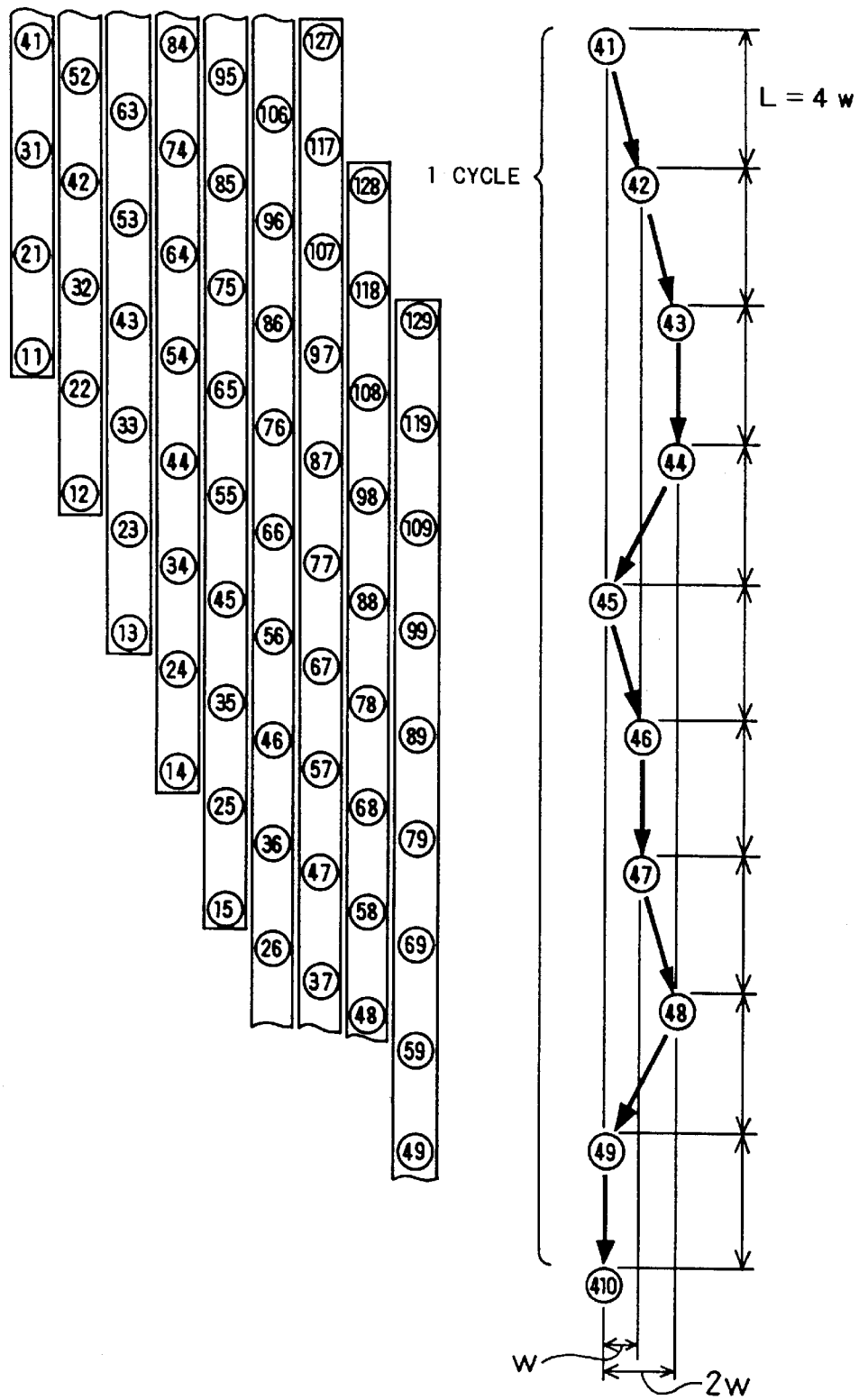
FIG. 11 is an diagram for explaining the dot recording start positions in each main scan in the fourth embodiment.

FIG. 11 is an explanatory diagram showing the dot recording start positions in each main scan in the fourth embodiment in extracted form. In the fourth embodiment, the sub-scanning pitch L is equal to 4w (w being the dot pitch). In the fourth embodiment, the pattern of the s×k=9 recording start position shifts indicated by the thick arrows constitute 1 cycle. That is, in the fourth embodiment 9 main scans constitute 1 cycle and the shifting of the recording start position in the main scanning direction is periodically repeated once every cycle.

As mentioned earlier, the amount of recording position shift in the main scanning direction at the time of sub-scanning can be any of s types in this invention, namely, any type between 0 and (s−1)·w (w being the dot pitch). The s types of shift amount adjustment are each conducted k times during 1 cycle. Since s=3 and k=3 in the fourth embodiment, the shift amount in the main scanning direction is of 3 types, 0, w and 2w, and adjustment by each of these shift amounts is conducted 3 times during 1 cycle.

Also in this fourth embodiment, sets of N dots are formed substantially along a straight line in the sub-scanning direction during 1 main scan. The scanning speed of the carriage 7 can therefore be increased for the same reason as explained regarding the first embodiment with reference to FIG. 5.

Like the first embodiment, the fourth embodiment can also conduct bidirectional printing and be applied in color printing using inks of multiple colors.

F. Fifth Embodiment

Figure 12:
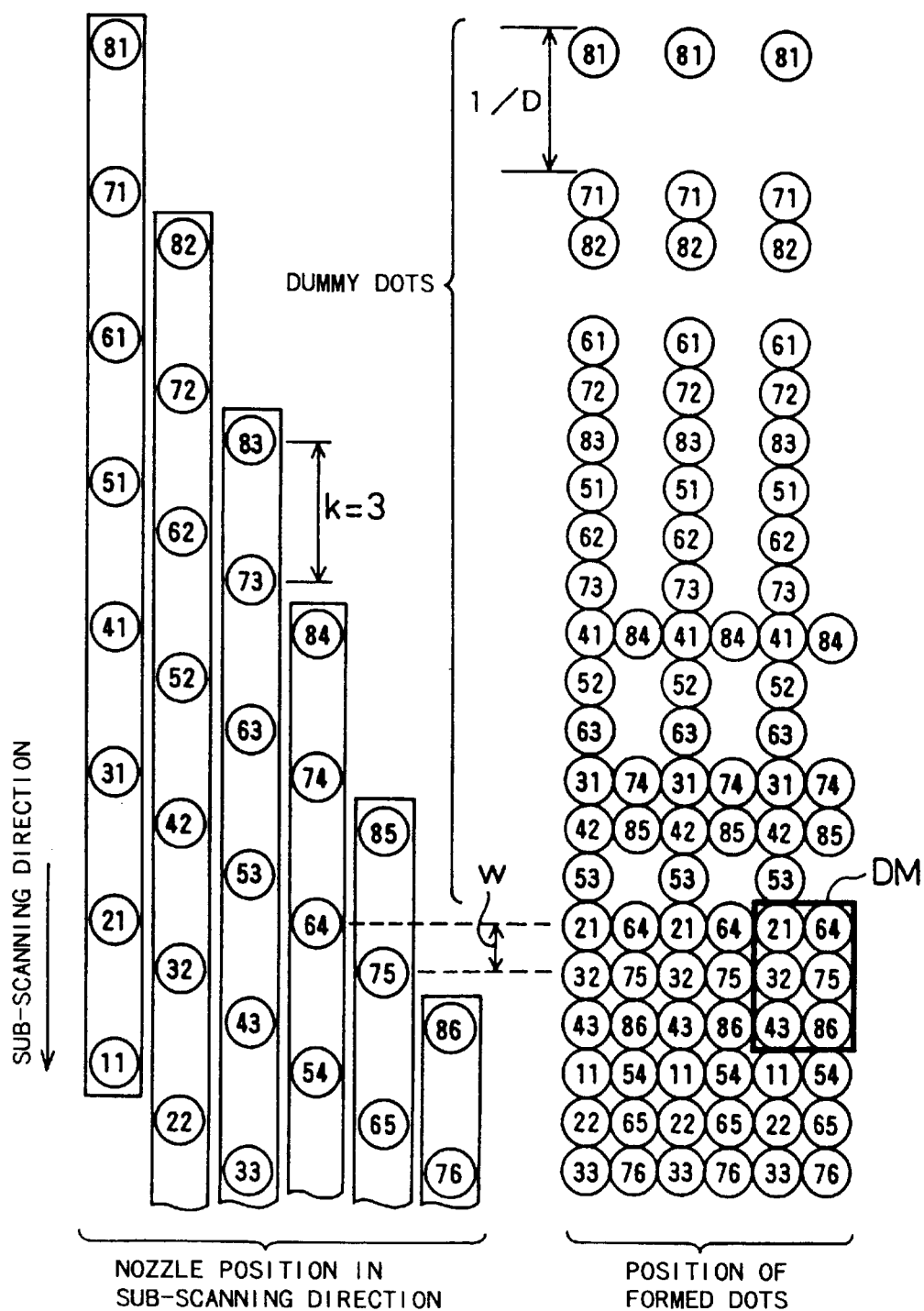
FIG. 12 is a diagram for explaining the dot recording scheme of a fifth embodiment.
Figure 13:
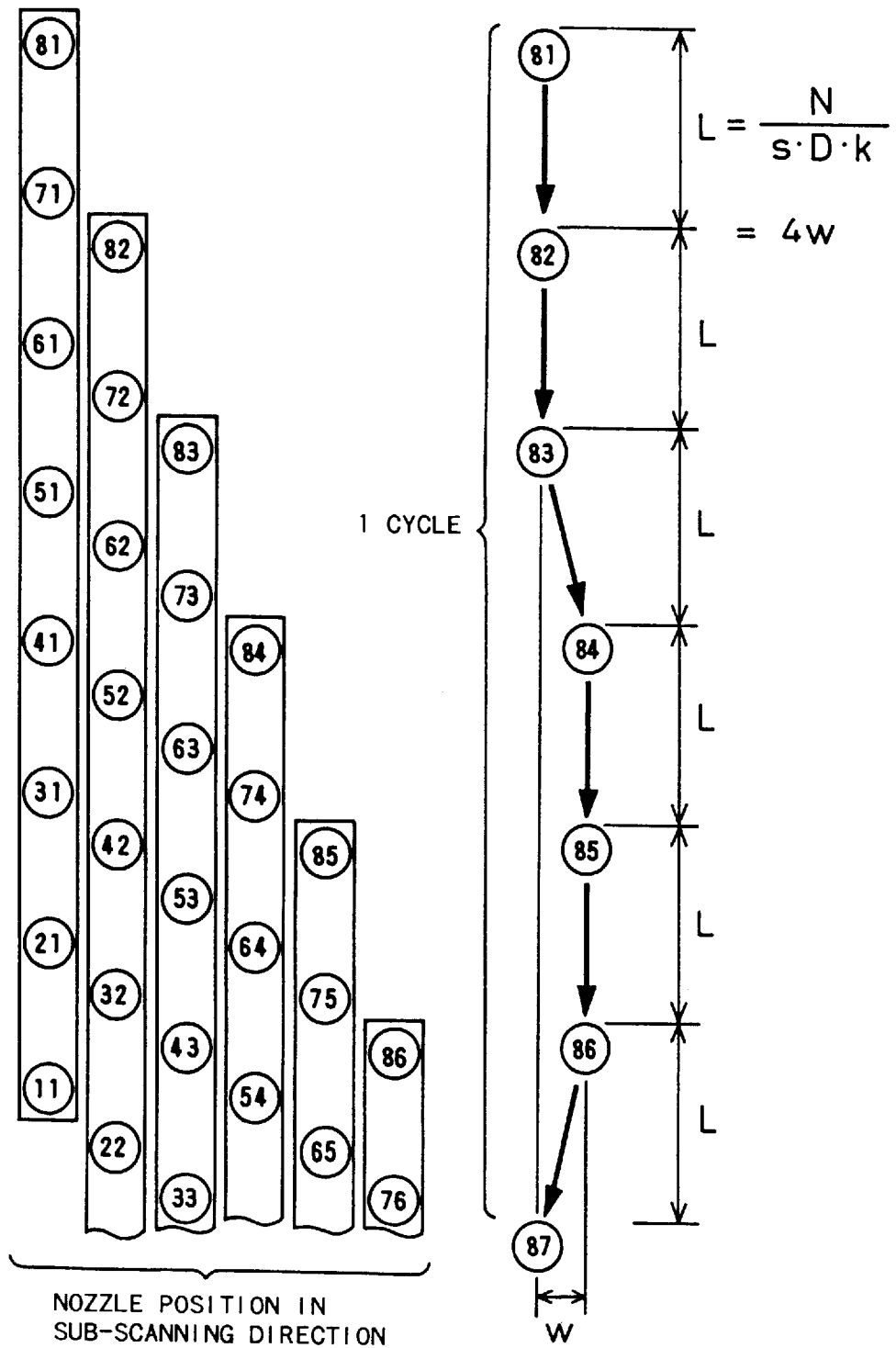
FIG. 13 is a diagram for explaining the dot recording start positions in each main scan in the fifth embodiment.

FIG. 12 is a diagram for explaining the dot recording scheme of a fifth embodiment. FIG. 13 is a diagram for explaining the dot recording start positions in each main scan in the fifth embodiment. The fifth embodiment similar to the third embodiment explained earlier and differs therefrom only in the main scanning direction shift pattern.

As can be seen from FIG. 13, in the fifth embodiment the recording position in the main scanning direction is maintained constant during k (=3) main scans and the recording position is adjusted after completion of the k main scans. The recording position in the main scanning direction is then kept the same in the following k main scans. In other words, in the fifth embodiment, the recording position in the main scanning direction is adjusted once every k main scans. This distinguishes the fifth embodiment from the first to forth embodiments which do not have this regularity.

The fifth embodiment has the advantage of requiring fewer recording position adjustments than the first to fourth embodiments. In the fifth embodiment, however, the probability of dots formed in 2 consecutive main scans being adjacent in the vertical direction is high. In contrast, when the recording position in the main scanning direction is adjusted every main scan (every sub-scan), as in the third embodiment for example, dots formed in 2 consecutive main scans are never adjacent. This is advantageous because it makes the probability of blotting by adjacent dots low. Also in the case of shifting the recording position every main scan, it suffices to conduct the recording position shift at least once during each cycle and recording position shifting in the main scanning direction does not have to be conducted between the last scan of one cycle and the first scan of the next cycle.

Figure 14:
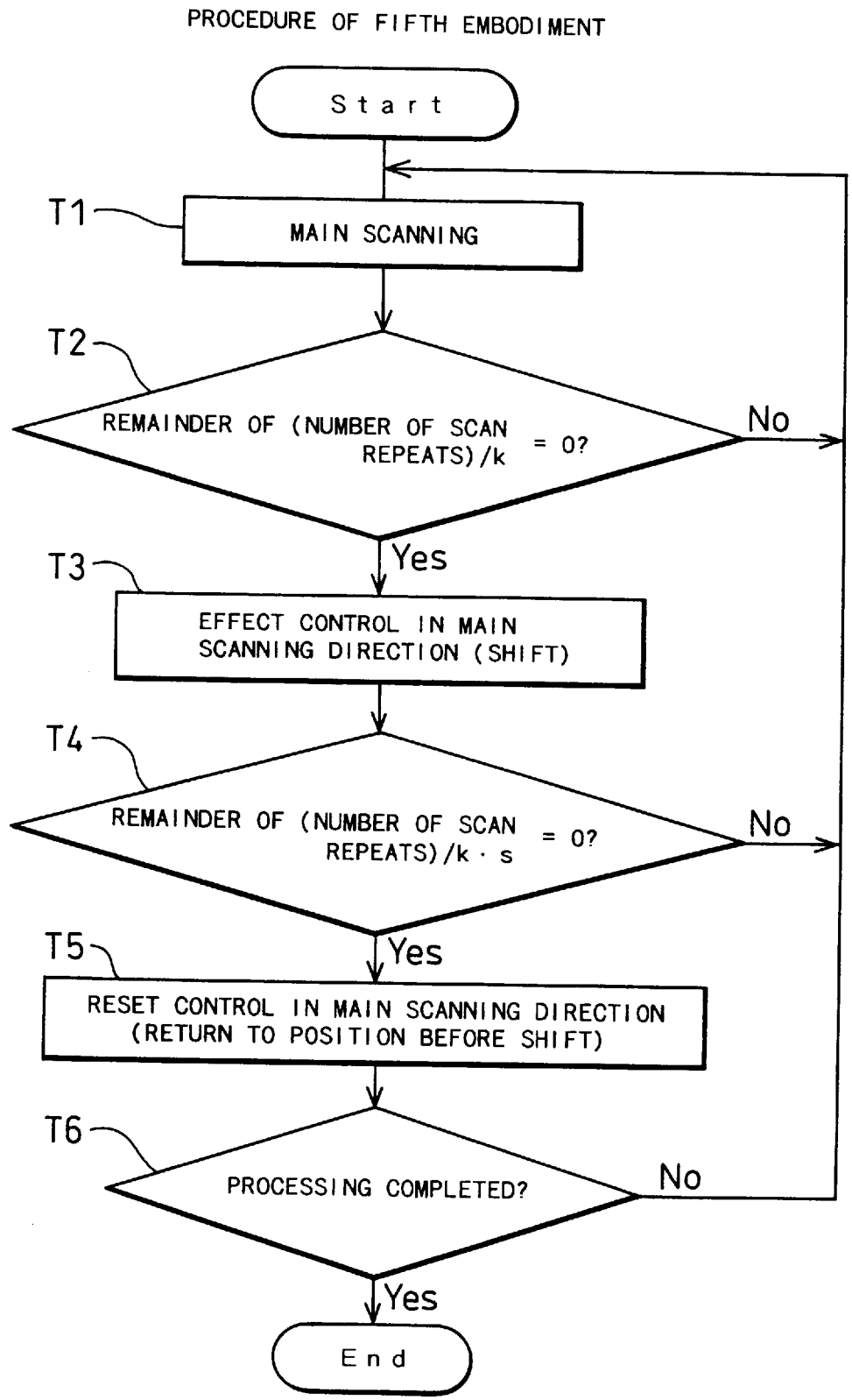
FIG. 14 is a flowchart of procedures for adjusting the recording position in the main scanning direction in the fifth embodiment.

FIG. 14 is a flowchart of procedures for adjusting the recording position in the main scanning direction in the fifth embodiment. In step T1, at the start, a single main scan is conducted. In step T2, it is checked whether dividing the number of scans (number of main scans) by the nozzle pitch k gives a remainder of 0. When the remainder is not 0, control is returned to step T1 and the next main scan is conducted. A sub-scan is of course conducted before this main scan. When step T2 finds the remainder to be 0, meaning that k main scans have been conducted, adjustment of the recording position in the main scanning direction is effected in step T3. Next, in step T4, it is checked whether dividing the number of scans by (k×s) gives a remainder of 0. When the remainder is not 0, control is returned to step T1 and the next scan is conducted. When step T4 finds the remainder to be 0, meaning that 1 cycle consisting of k×s main scans has been completed, the adjustment of the recording position in the main scanning direction is reset to the initial basic position in step T5. Then, in step T6, it is checked whether the print processing has been completed. When the result is negative, control is to step T1. Printing is completed by repeating steps T1–T6 in this manner.

G. Sixth Embodiment

Figure 15:
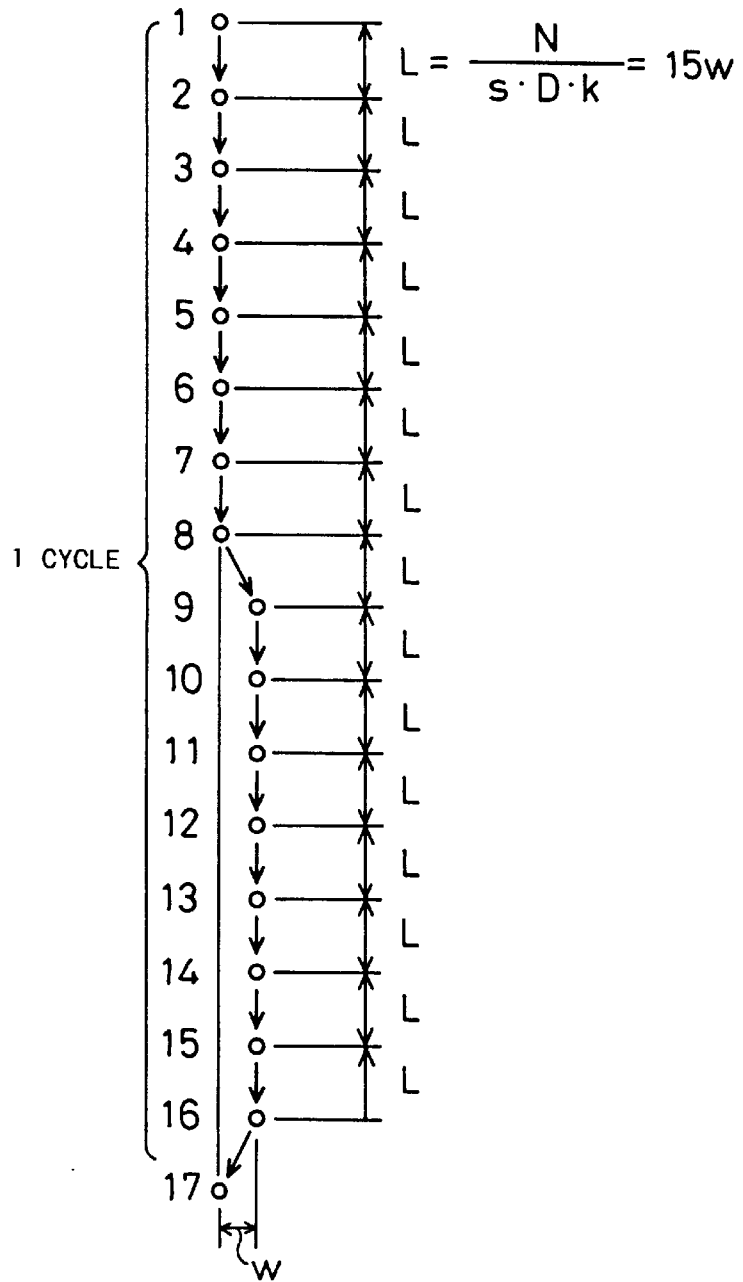
FIG. 15 is a diagram for explaining the dot recording start positions in the individual main scans in a sixth embodiment.

FIG. 15 is a diagram for explaining the dot recording start positions in the individual main scans in a sixth embodiment. The sixth embodiment enabled excellent performance when applied to an actual ink jet printer. The nozzle pitch k is 8, the number of scan repeats s 2, and the number of nozzles N 30. N/s=15, so that N/s and nozzle pitch k are relatively prime. The sub-scanning pitch L is 15 times the dot pitch w. As shown in FIG. 15, when the nozzle density D is defined as 90 [dot/inch], the sub-scanning pitch L becomes 15/720[inch] and the dot pitch w becomes 1/720[inch]. The sixth embodiment thus achieves a recording density of 720 [dpi]. For convenience of drawing preparation, the dot pattern formed by the sixth embodiment (corresponding to that of FIG. 3) is not shown in the figure.

As can be seen from FIG. 15, like the fifth embodiment, the sixth embodiment first holds the recording position in the main scanning direction constant for k (=8) main scans and then adjusts it at the next sub-scan. The recording position in the main scanning direction is then kept the same in the following k main scans. In other words, the recording position in the main scanning direction is adjusted once every k main scans. One cycle is constituted by s×k (=16) main scans and the shifting of the recording start position in the main scanning direction is periodically repeated once every cycle.

H. Seventh Embodiment

Figure 16:
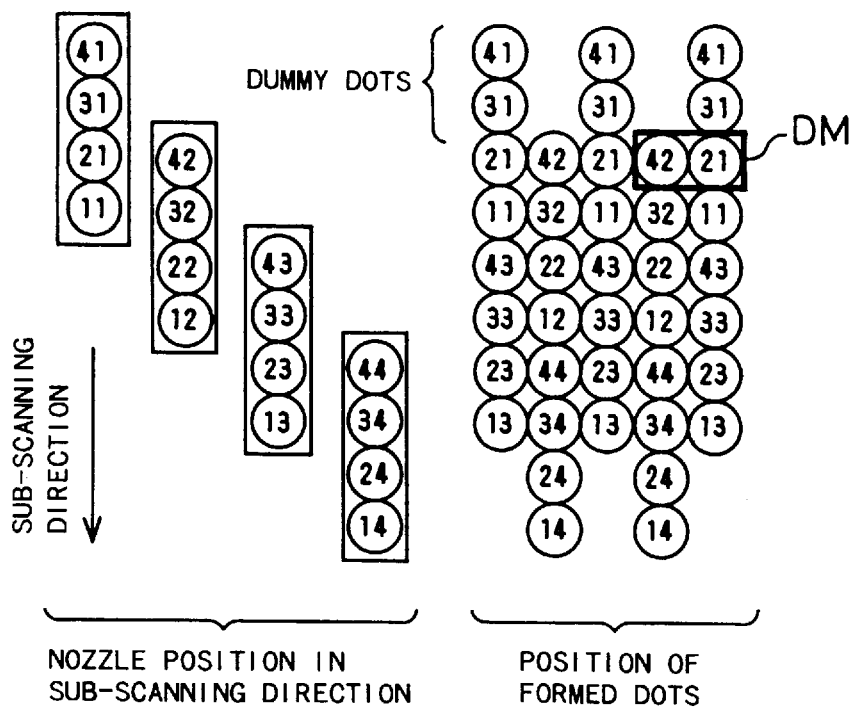
FIG. 16 is a diagram for explaining the dot recording scheme of a seventh embodiment.

FIG. 16 is a diagram for explaining the dot recording scheme of a seventh embodiment. The seventh embodiment differs from the first to sixth embodiments in the point that the nozzle pitch k is 1. The number of scan repeats s is 2 and the number of nozzles N is 4, so that N/s=2. Although the nozzle pitch k is 1, N/s and nozzle pitch k can also in this case be called relatively prime.

During each main scan, each of the 4 nozzles is intermittently driven to sets of dots separated by an interval of 1 dot position in the main scanning direction, i.e., to form a set of dots at every second dot position. Each of the s×k (=2×1) dots in the dot matrix DM at the far right in FIG. 16 is formed in a different main scan by a different nozzle.

Figure 17:
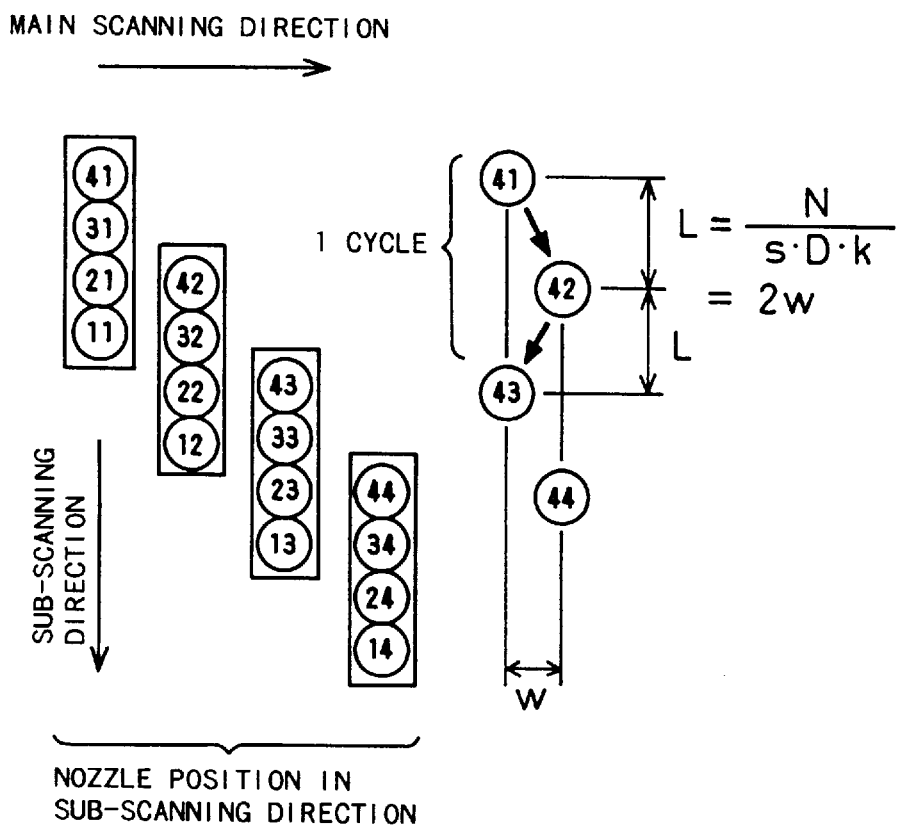
FIG. 17 is a diagram for explaining the dot recording start positions in each main scan in the seventh embodiment.

FIG. 17 is a diagram for explaining the dot recording start positions in each main scan in the seventh embodiment. In the seventh embodiment, the sub-scanning pitch L is equal to 4w (w being the dot pitch). In the seventh embodiment, the pattern of the s×k=2 recording start position shifts indicated by the thick arrows constitute 1 cycle. That is, in the seventh embodiment 2 main scans constitute 1 cycle and the shifting of the recording start position in the main scanning direction is periodically repeated once every cycle.

Also in the seventh embodiment, sets of N dots are formed substantially along a straight line in the sub-scanning direction during 1 main scan. The scanning speed of the carriage 7 can therefore be increased for the same reason as explained regarding the first embodiment with reference to FIG. 5. In the seventh embodiment, however, the sets of N dots are formed next to each other. Blotting may therefore occur owing to interference between neighboring dots. From this aspect, the N dots aligned in the sub-scanning direction are preferably spaced from each other (positioned apart from each other by an interval of at least 1 dot position), as in the first to sixth embodiments. In this case, the nozzle pitch k is selected as desired from among integers greater than 1 and less than N.

Like the first embodiment, the seventh embodiment can also conduct bidirectional printing and be applied in color printing using inks of multiple colors.

As can be understood from the different embodiments explained in the foregoing, this invention enables the carriage 7 to be operated at a high scanning speed. The number of scan repeats s can be set to any desired integer greater than 1 and less than N. Since image nonuniformity owing to variance among head characteristics decreases as the number of scan repeats s increases, the image quality can be improved. Conversely, the recording speed increases as the number of scan repeats s decreases. The actual number of scan repeats s adopted is therefore appropriately set to optimize the balance between image quality and recording speed. The number of scan repeats s can be selected as desired from among integers greater than 1 and less than N. The number of scan repeats s is preferably set at 2–4, more preferably at 2.

Multiple recording mode options like those of the embodiments set out in the foregoing can be registered beforehand as printer driver settings selectable by the user. For instance, a choice can be provided beforehand between a high image quality mode with a large number of scan repeats s (e.g., a mode in which s=2, N=6, k=2) and a high-speed mode with a small number of scan repeats s (e.g., a mode in which s=1, N=7, k=2). This enables the user to select the recording mode (printing mode) as appropriate depending on whether precedence is to be given to image quality or speed.

Figure 18:
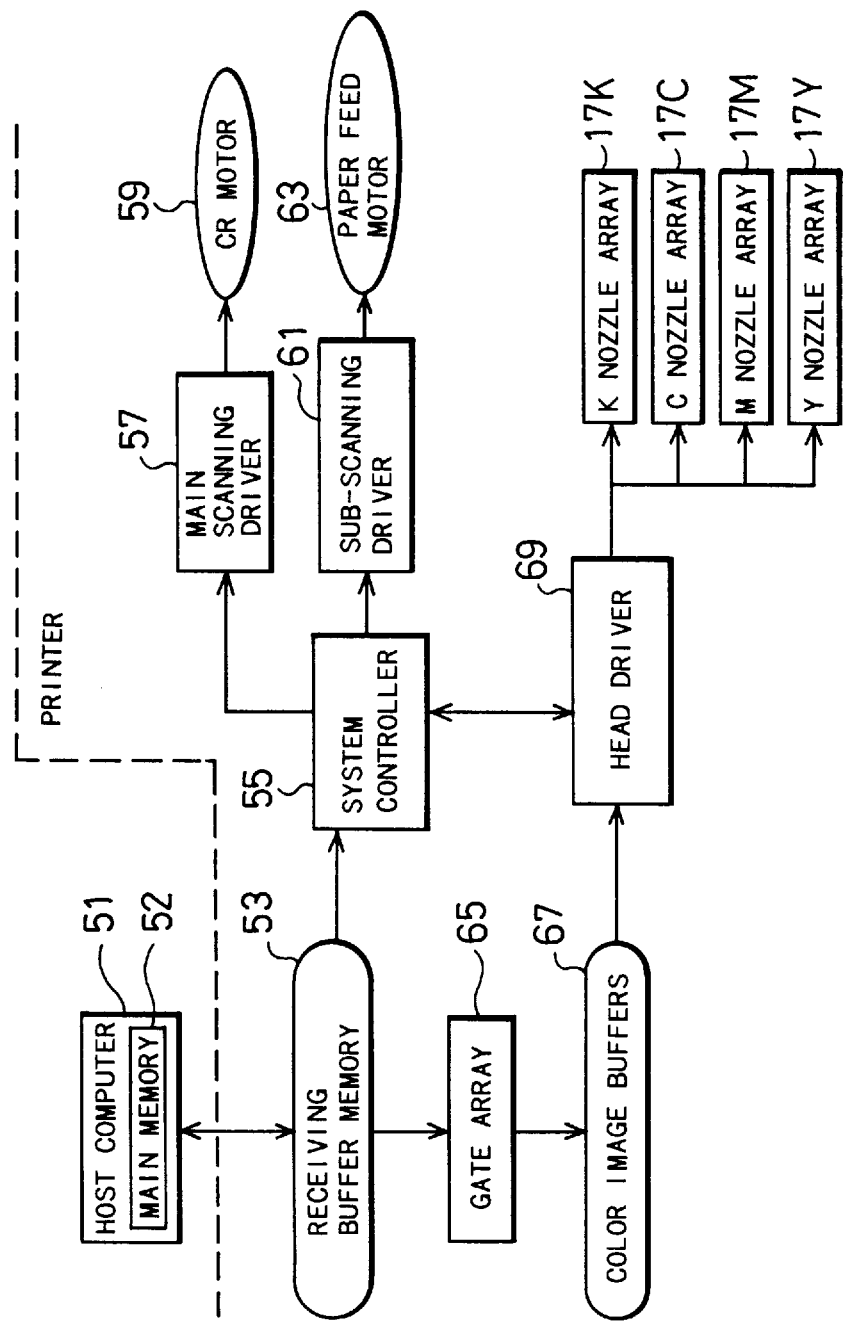
FIG. 18 is a block diagram showing the internal configuration of a printer.

I. Printer Internal Configuration and Operation:

FIG. 18 is a block diagram showing the internal configuration of a printer. A host computer 51 is installed with a printer driver program (not shown) which determines the values of the aforesaid various parameters based on the printing mode designated by the user. The printer driver program is stored in a main memory 52 of the host computer. The printer driver program further generates print data based on the parameter values for printing in the designated printing mode and sends the generated print data to the printer. When the number of scan repeats s is 2, for example, the printer driver successively generates for each main scan print data which indicate whether or not a dot is to be formed at each recording position located at every second dot position on the N number of main scanning lines and sends these print data to the printer. (The image data processing procedure effected by the printer driver program is explained later.) The print data sent to the print are once stored in a receiving buffer memory 53.

A system controller 55 inside the printer reads the print data from the receiving buffer memory 53 and sends control signals based on the print data to a main scanning driver 57, a sub-scanning driver 61 and a head driver 69.

A gate array 65 reads the print data from the receiving buffer memory 53, generates sets of K, C, M and Y color image data based thereon, and writes the generated data sets to color image buffers 67 for the respective color image data sets. The head driver 69 reads the color image data sets from the color image buffers 67 in response to the control signal from the system controller 55 and drives nozzle arrays 17K, 17C, 17M and 17Y accordingly. Each color image data set corresponds to the drive signal Sdot shown in FIG. 5 discussed earlier. In response to the control signals from the system controller 55, the main scanning driver 57 drives a carriage motor 59 and the sub-scanning driver 61 drives a paper feed motor 63.

The head driver 69 in FIG. 18 corresponds to the head driving means of this invention. The head driver 69 functions both as intermittent driving means for driving the nozzle arrays for intermittent dot formation and as recording position adjustment means for adjusting the recording position in the main scanning direction. The main scanning driver 57 and the carriage motor 59 correspond to the main scan driving means of this invention. The sub-scanning driver 61 and the paper feed motor 63 correspond to the sub-scan driving means of this invention.

Figure 19:
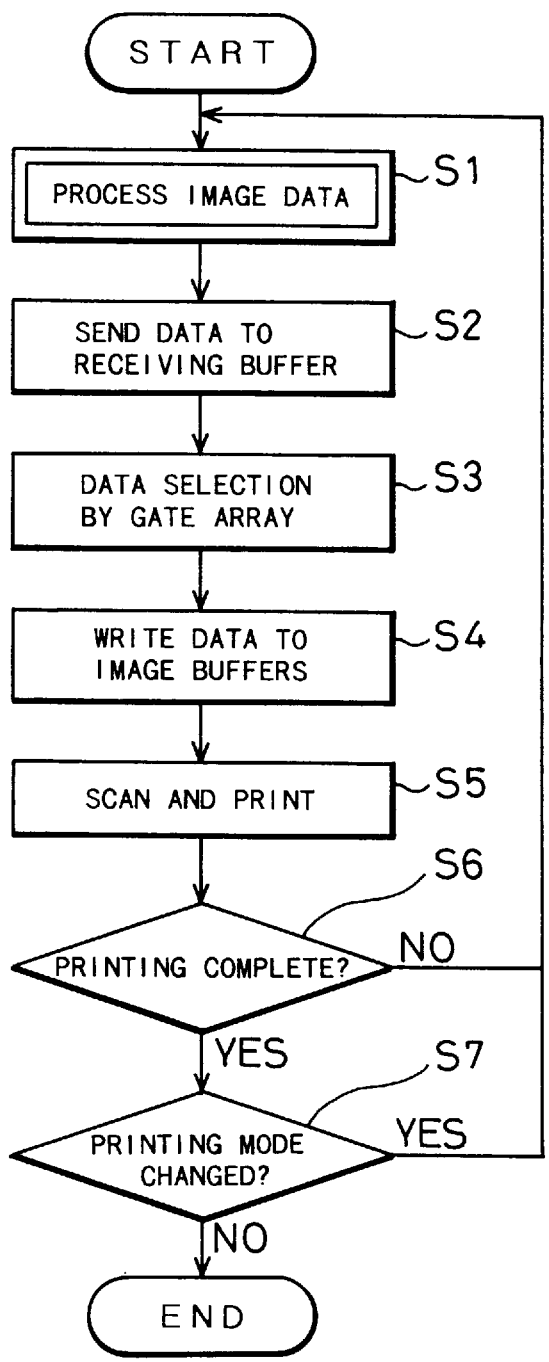
FIG. 19 is a flowchart showing the overall flow of printing operations.

FIG. 19 is a flowchart showing the flow of printing operations. First, the printer driver program of the host computer 51 processes the image data in accordance with the printing mode designated by the user (S1). The print data produced by this processing is sent to the receiving buffer memory 53 of the printer (S2). In the printer, the gate array 65 reads the print data from the receiving buffer memory 53 (S3), generates sets of image data for printing the K, C, M and Y colors based thereon, and writes the generated sets of image data to the image buffers (S4). The carriage motor 59, the paper feed motor 63 and the nozzle arrays 17K, 17C, 17M and 17Y for the respective colors are then driven under the control of the system controller 55 to effect printing (S5).

The foregoing operations are repeated until the printing is completed. When it is found that the printing has been completed (S6), the host computer 51 checks whether the user has input a printing mode change (S7). When the result is negative, the processing is terminated, and when it is affirmative, the foregoing series of processing steps is effected again in the newly designated printing mode.

Figure 20:
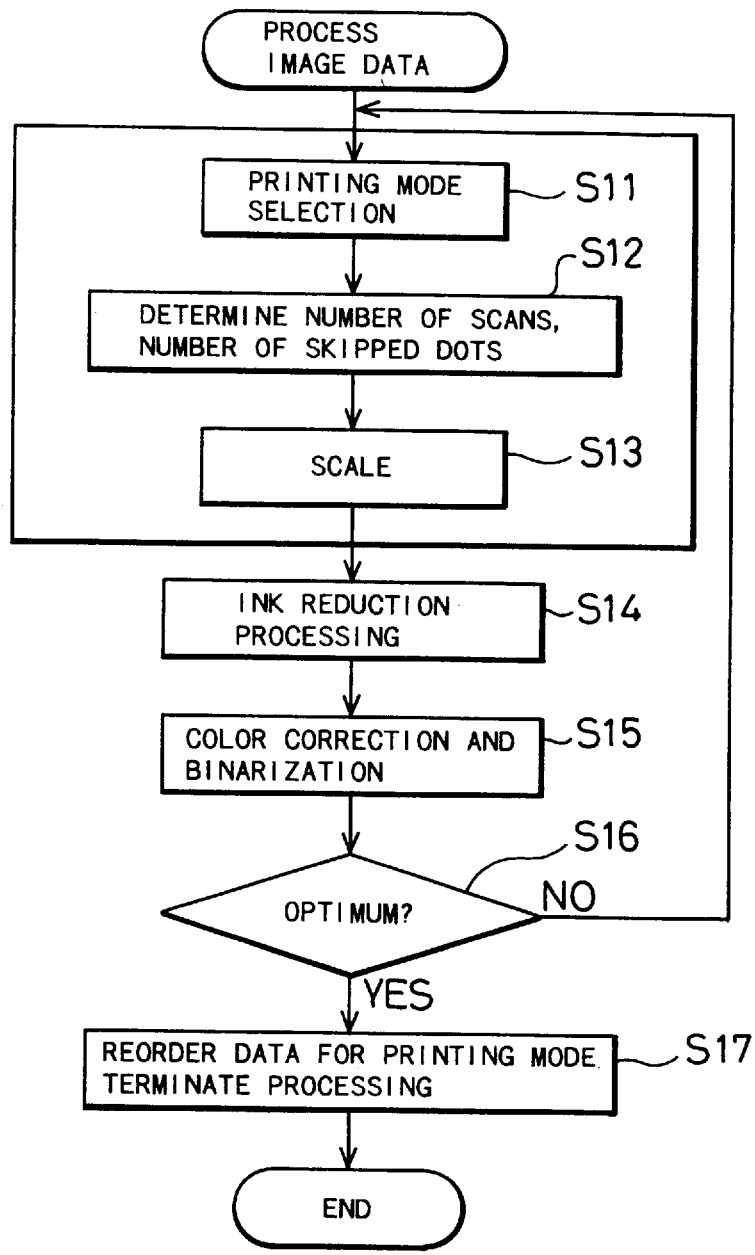
FIG. 20 is a flowchart showing the flow of the image data processing effected by a printer driver of a host computer 51.

FIG. 20 is a flowchart showing the flow of the image data processing effected by the printer driver program of the host computer 51 (step S1 of FIG. 19). The printer driver program functions as a print data generating unit which generates print data for driving the printer from the image data and supplies it to the printer. First, the printing mode selection is received from the user (S11). The printing parameter values, including those of the number of scan repeats s and the various other parameters mentioned earlier, are defined in accordance with the selected printing mode (S12). Next, any required scaling processing is conducted, i.e., the original image data generated by the application is converted to image data of the resolution set in the selected printing mode (S13).

Ink reduction processing is then conducted (S 14). (Ink reduction processing is conducted to impose a duty limit on the image data in accordance with the amount of ink that can be accepted by the type of printing paper selected by the user.) Next, the image data (generally of 256 gradations per color in RGB expression) is subjected to color correction and binarization to generate print data by converting the image data to binary data in CMY expression (S15).

A check is then made as to whether the print data subjected to the foregoing processing is optimum (S16). If the result is negative, the processing is redone starting from printing mode selection. When it is affirmative, the print data are reordered to match the order of color dot formation in accordance with the printing mode (S17) and the image data processing is terminated.

Figure 21:
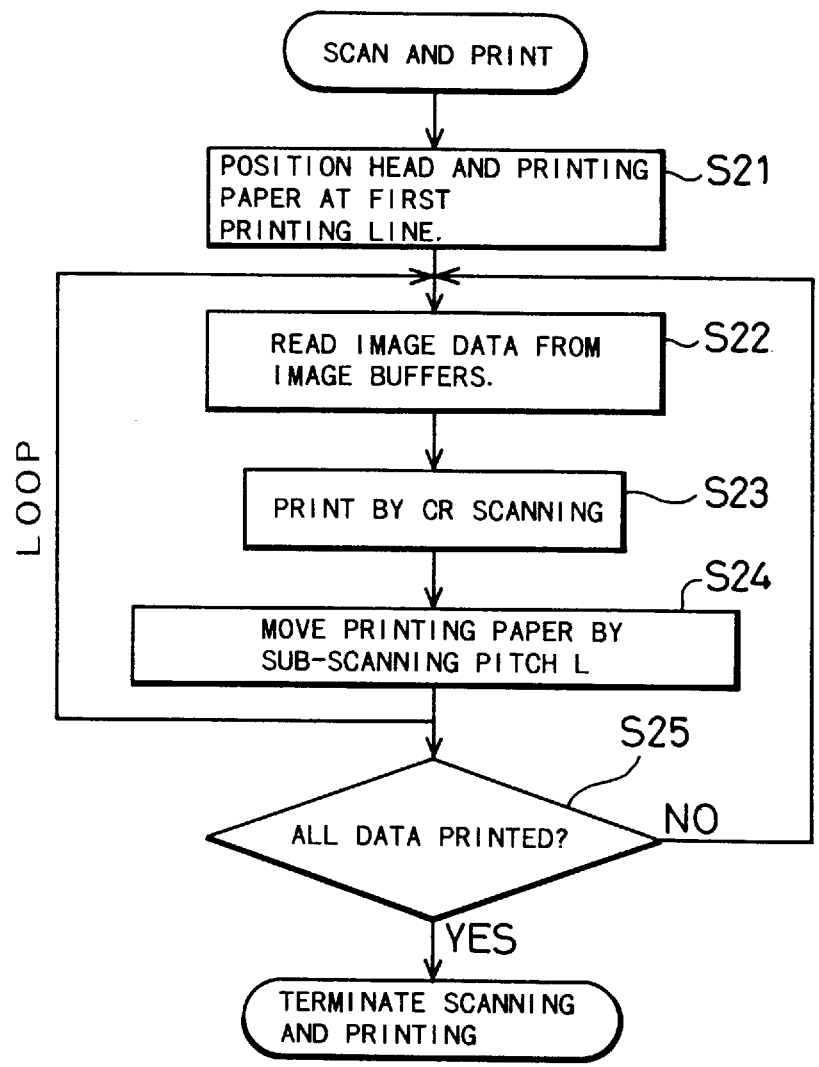
FIG. 21 is a flowchart showing the flow of scanning and printing processing conducted under control of a system controller 55.
Figure 22:
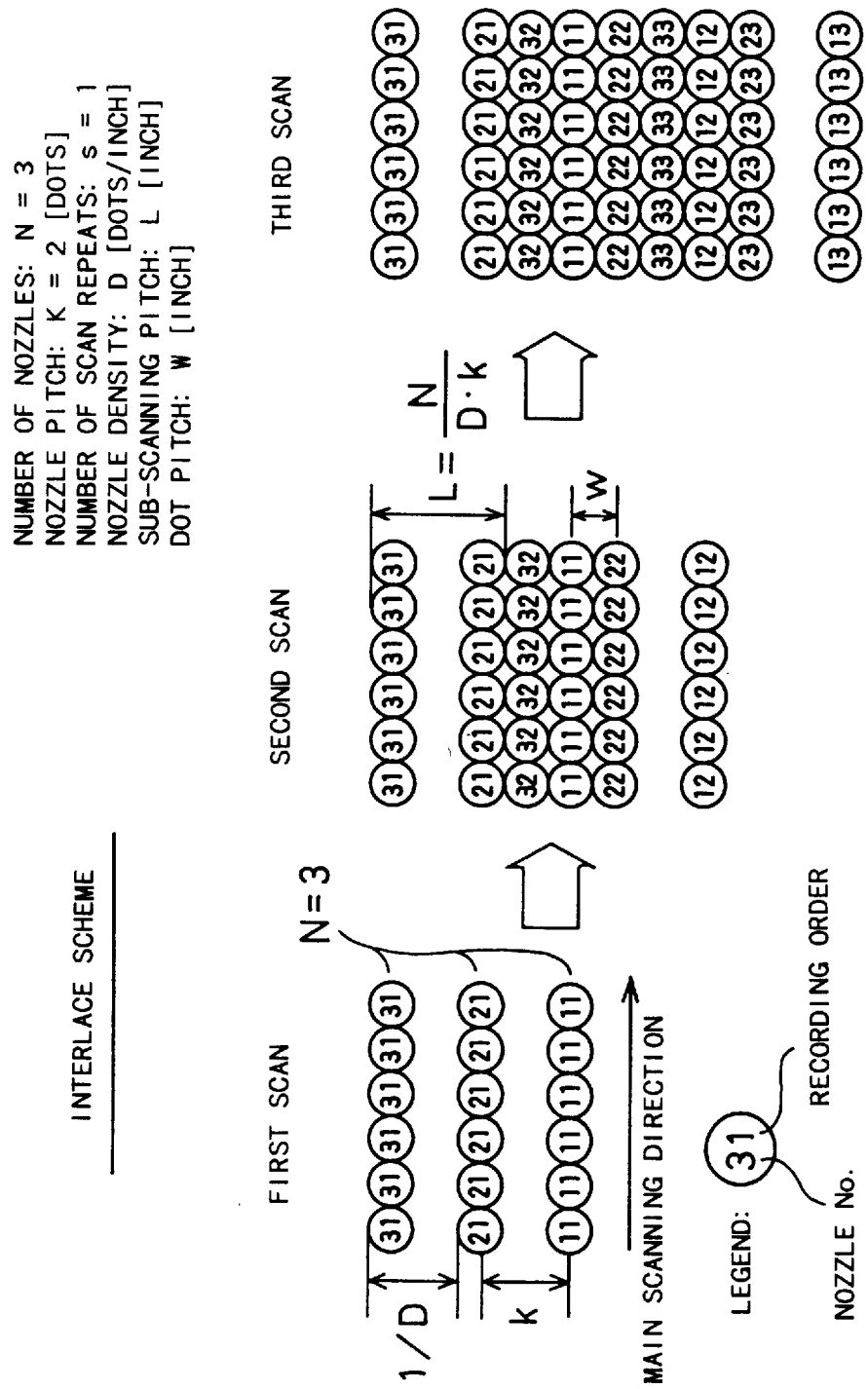
FIG. 22 is a diagram for explaining an example of the prior-art interlace scheme.

FIG. 21 is a flowchart showing the flow of the scanning and printing processing conducted under the control of the system controller 55 (step S5 of FIG. 19). First, positioning of the printing head and printing paper is effected to start printing from the first printing line (S21). Next, image data (print data) for the respective colors are read from the color image buffers 67 (S22) and printing is conducted by driving the respective color nozzles in accordance with the image data while moving the carriage (S23). When the main scan is finished, the printing paper is moved by the sub-scanning pitch L (S24). When printing of 1 page has been completed, steps S22 to S24 are repeated.

The foregoing processing is repeated until all pages have been printed. When it is found that all pages have been printed (S25), the scanning and printing are terminated.

The present invention is in no way limited to the details of the examples and embodiments described in the foregoing but various changes and modifications may be made without departing from the scope of the appended claims. For example, the following modifications are also possible.

(1) The invention can be applied not only to color printing but also to monochrome printing. It can also be applied to printing in which multilevel gradations are expressed by use of multiple dots to express individual pixels. Application to a drum scan printer is also possible. In the case of a drum scan printer, the direction of drum rotation is the main scanning direction and the carriage travel direction is the sub-scanning direction. This invention can be applied not only to ink jet printers but also generally to any recording apparatus which effects recording on the surface of a recording medium by causing a recording head having an array of N dot forming elements to scan the surface of the recording medium in main scanning and sub-scanning directions. "Dot forming element" as termed here means a constituent element for forming dots, such as an ink nozzle in an ink jet printer.

(2) In each of the foregoing embodiments, each of the N nozzles aligned in the sub-scanning direction is intermittently driven once every s dot positions in the main scanning direction, whereby a dot is formed once every s dot positions. Thus after a nozzle conducting a scan in the main scanning direction is enabled to form a dot, it is disabled for (s−1) dot positions. Instead, it is possible to enable a nozzle conducting a scan in the main scanning direction to form a prescribed number of dots and thereafter disable it so as not to form dots for (s−1) dot positions. For example, the nozzle can be enabled to form dots at 2 dot position and then disabled so as not to form dots at 2 dot positions.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A recording apparatus for effecting recording on a surface of a recording medium by causing a recording head to scan the surface of the recording medium in a main scanning direction and a sub-scanning direction, the recording apparatus comprising:

a dot forming element array disposed at a portion of the recording head facing the recording medium, the dot forming element array having N dot forming elements for forming sets of N dots of a same color at a substantially fixed pitch in the sub-scanning direction, where N is an integer greater than 1;

main scan driving means for causing the recording head to conduct main scans in the main scanning direction;

head driving means for driving the dot forming element array during the main scans to form dots; and sub-scan driving means for conducting a sub-scan of a fixed distance in the sub-scanning direction at the end of each main scan;

wherein the head driving means comprising:

intermittent driving means for, during each main scan, driving the dot forming element array to enable formation of a set of N dots substantially along a straight line in the sub-scanning direction and to enable formation of plural sets of the N dots in the main scanning direction at intermittent timing such that the formation of the N dots is enabled for a prescribed number of dot positions in the main scanning direction and that the formation of the N dots is disabled for (s−1) dot positions in the main scanning direction where s is an integer greater than 1; and recording position adjustment means for effecting an adjustment for shifting the recording positions of the sets of N dots in the main scanning direction by an integral multiple of the dot pitch from a prescribed reference position in at least some main scans to enable servicing of multiple dot positions in a prescribed recording region on the recording medium; and wherein the intermittent driving means drives, during each main scan, the dot forming element array to enable formation of a set of N dots substantially along a straight line in the sub-scanning direction and to enable formation of plural sets of the N dots in the main scanning direction at intermittent timing such that the formation of the N dots is enabled for one dot position in the main scanning direction and that the formation of the N dots is disabled for (s−1) dot positions in the main scanning direction;

wherein the integer s is a number of scan repeats indicating a number of main scans required for printing a continuous line in the main scanning direction, and wherein a sub-scanning pitch L is selected to satisfy the relationship of L=N/(s·D·k) where L is the fixed distance, k is an element pitch indicating an interval between centers of adjacent ones of the N dots expressed in units of a dot pitch of a recorded image, and D is an element density indicating a number of dots per unit distance measured in the sub-scanning direction for the N dots is defined;

the number of scan repeats s is set at a desired integer greater than 1 and less than N; and the element pitch k is set at a desired integer which is greater than 1 and less than N and which is prime with respect to N/s.

2. A recording apparatus according to claim 1, further comprising:

print data generating means for generating print data for driving the dot forming element array, the head driving means performing the driving of the dot forming element array responsive to the print data;

wherein the print data generating means comprises:

means for intermittently supplying to the head driving means during each main scan only data for the prescribed number of dot positions in the main scanning direction.

3. A recording apparatus according to claim 1, wherein the recording position adjustment means comprises means for periodically conducting the adjustment of the recording positions of the sets of N dots in the main scanning direction during each cycle, a cycle being defined as a prescribed number of main scans.

4. A recording apparatus according to claim 3, wherein the recording position adjustment means further comprises means for shifting the recording position in the main scanning direction with respect to each main scan during each cycle.

5. A recording apparatus according to claim 1, wherein the head driving means comprises not only the intermittent recording mode in which the dot forming element array is disabled from forming dots for (s−1) dot positions after forming of a set of the N dots at one dot position but also a nonintermittent recording mode in which the dot forming element array is enabled to form dots at all dot positions in the main scanning direction without skipping any dot positions; and the main scan driving means scans the recording head in the intermittent recording mode s times faster than in the nonintermittent recording mode.

6. A recording apparatus according to claim 1, further comprising recording mode selecting means for selecting one recording mode from among a plurality of recording modes having different numbers of scan repeats s.

7. A recording apparatus according to claim 1, wherein the head driving means comprises means for driving the dot forming element array to enable servicing of s×k dot positions within a dot matrix having s dot positions in the main scanning direction and k dot positions in the sub-scanning direction by dot recording in s×k consecutive main scans.

8. A recording apparatus according to claim 1, wherein:

the head driving means comprises means for driving the dot forming element array during both a forward trip and a return trip of the main scan; and the sub-scan driving means comprises means for conducting a sub-scan of the fixed distance in the sub-scanning direction at the end of each forward trip and the end of each return trip.

9. A recording method for effecting recording on a recording medium using a recording head having a dot forming element array disposed at a portion of the recording head facing the recording medium, the dot forming element array having N dot forming elements for forming sets of N dots of a same color at a substantially fixed pitch in the sub-scanning direction, where N is an integer greater than 1, the method comprising the steps of:

(a) causing the recording head to conduct main scans in the main scanning direction;

(b) driving the dot forming element array during the main scans to form dots; and (c) conducting a sub-scan of a fixed distance in the sub-scanning direction at the end of each main scan;

wherein the step (b) comprises the steps of:

(i) driving, during each main scan, the dot forming element array to enable formation of a set of N dots substantially along a straight line in the sub-scanning direction and to enable formation of plural sets of the N dots in the main scanning direction at intermittent timing such that the formation of the N dots is enabled for a prescribed number of dot positions in the main scanning direction and that the formation of the N dots is disabled for (s−1) dot positions in the main scanning direction where s is an integer greater than 1; and (ii) effecting an adjustment for shifting the recording positions of the sets of N dots in the main scanning direction by an integral multiple of the dot pitch from a prescribed reference position in at least some main scans to enable servicing of multiple dot positions in a prescribed recording region on the recording medium; and wherein:

the step (c) comprises the step of driving, during each main scan, the dot forming element array to enable formation of a set of N dots substantially along a straight line in the sub-scanning direction and to enable formation of plural sets of the N dots in the main scanning direction at intermittent timing such that the formation of the N dots is enabled for one dot position in the main scanning direction and that the formation of the N dots is disabled for (s−1) dot positions in the main scanning direction;

wherein the integer s is a number of scan repeats indicating a number of main scans required for printing a continuous line in the main scanning direction, and wherein a sub-scanning pitch L is selected to satisfy the relationship of L=N/(s·D·k) where L is the fixed distance, k is an element pitch indicating an interval between centers of adjacent ones of the N dots expressed in units of a dot pitch of a recorded image, and D is an element density indicating a number of dots per unit distance measured in the sub-scanning direction for the N dots is defined;

the number of scan repeats s is set at a desired integer greater than 1 and less than N; and the element pitch k is set at a desired integer which is greater than 1 and less than N and which is prime with respect to N/s.

10. A recording method according to claim 9, wherein the step (b) further comprising the step of:

intermittently supplying to a head driver for driving the dot forming element array during each main scan only data for the prescribed number of dot positions in the main scanning direction.

11. A recording method according to claim 9, wherein the step (b) comprises the step of periodically conducting the adjustment of the recording positions of the sets of N dots in the main scanning direction during each cycle, a cycle being defined as a prescribed number of main scans.

12. A recording method according to claim 11, wherein the step (b) further comprises the step of shifting the recording position in the main scanning direction with respect to each main scan during each cycle.

13. A recording method according to claim 9, wherein the method comprises not only the intermittent recording mode in which the dot forming element array is disabled from forming dots for (s−1) dot positions after forming of a set of the N dots at one dot position but also a nonintermittent recording mode in which the dot forming element array is enabled to form dots at all dot positions in the main scanning direction without skipping any dot positions; and the step (a) is performed so as to scan the recording head in the intermittent recording mode s times faster than in the nonintermittent recording mode.

14. A recording method according to claim 9, further comprising the step of:

selecting one recording mode from among a plurality of recording modes having different numbers of scan repeats s.

15. A recording method according to claim 9, wherein the step (b) comprises the step of driving the dot forming element array to enable servicing of s×k dot positions within a dot matrix having s dot positions in the main scanning direction and k dot positions in the sub-scanning direction by dot recording in s×k consecutive main scans.

16. A recording method according to claim 9, wherein:

step (b) comprises the step of driving the dot forming element array during both a forward trip and a return trip of the main scan; and the step (c) comprises the step of conducting a sub-scan of the fixed distance in the sub-scanning direction at the end of each forward trip and the end of each return trip.

17. A computer program product, for use in a computer system comprising a printer having a recording head, for effecting recording on a recording medium using the recording head, the recording head having a dot forming element array disposed at a portion of the recording head facing the recording medium, the dot forming element array having N dot forming elements for forming sets of N dots of a same color at a substantially fixed pitch in the sub-scanning direction, where N is an integer greater than 1, the computer program product comprising:

a computer readable medium; and computer program code means stored on the computer readable medium, the computer program code means comprising:

first program code means for causing a computer to drive, during each main scan, the dot forming element array to enable formation of a set of N dots substantially along a straight line in the sub-scanning direction and to enable formation of plural sets of the N dots in the main scanning direction at intermittent timing such that the formation of the N dots is enabled for a prescribed number of dot positions in the main scanning direction and that the formation of the N dots is disabled for (s−1) dot positions in the main scanning direction where s is an integer greater than 1; and second program code means for causing the computer to effect an adjustment for shifting the recording positions of the sets of N dots in the main scanning direction by an integral multiple of the dot pitch from a prescribed reference position in at least some main scans to enable servicing of multiple dot positions in a prescribed recording region on the recording medium;

wherein the first program code means comprises program code means causing the computer to drive, during each main scan, the dot forming element array to enable formation of a set of N dots substantially along a straight line in the sub-scanning direction and to enable formation of plural sets of the N dots in the main scanning direction at intermittent timing such that the formation of the N dots is enabled for one dot position in the main scanning direction and that the formation of the N dots is disabled for (s−1) dot positions in the main scanning direction;

wherein the integer s is a number of scan repeats indicating a number of main scans required for printing a continuous line in the main scanning direction, and wherein a sub-scanning pitch L is selected to satisfy the relationship of $L=N/(s \cdot D \cdot k)$ where L is the fixed distance, k is an element pitch indicating an interval between centers of adjacent ones of the N dots expressed in units of a dot pitch of a recorded image, and D is an element density indicating a number of dots per unit distance measured in the sub-scanning direction for the N dots is defined;

the number of scan repeats s is set at a desired integer greater than 1 and less than N; and the element pitch k is set at a desired integer which is greater than 1 and less than N and which is prime with respect to N/s.

* * * * *

UNITED STATES PATENT AND TRADEMARK OFFICE
CERTIFICATE OF CORRECTION

PATENT NO. : 5,889,537
DATED : MARCH 30, 1999
INVENTOR(S) : Kazumichi Shimada

It is certified that error appears in the above-identified patent and that said Letters Patent is hereby corrected as shown below:

In Claim 1, Column 18, lines 47-48, change "a prescribed number of" to --one dot position of every s--;

lines 61-67, reading "the intermittent drawing means... ...is enabled for", delete in their entirety;

Column 19, lines 1-3, reading "one dot... ...scanning direction;", delete in their entirety;

line 4, before "the integer s", delete "wherein";

line 7, after "direction,", delete "and";

line 8, before "a sub-scanning", delete "wherein";

line 15, after "N dots", delete "is defined".

UNITED STATES PATENT AND TRADEMARK OFFICE
CERTIFICATE OF CORRECTION

PATENT NO. : 5,889,537
DATED : MARCH 30, 1999
INVENTOR(S) : Kazumichi Shimada

It is certified that error appears in the above-identified patent and that said Letters Patent is hereby corrected as shown below:

Claim 9, Column 20, line 28, change "a prescribed number of" to --one dot position of every s--;

lines 40-50, reading "the step (c)... ...main scanning direction;", delete in their entirety;

line 51, before "the integer s", delete "wherein";
    line 54, after "direction,", delete "and";
    line 55, before "a sub-scanning", delete "wherein";
    line 62, after "N dots", delete "is defined".

Signed and Sealed this

Fifteenth Day of August, 2000

Attest:

Q. TODD DICKINSON

*Attesting Officer*     *Director of Patents and Trademarks*